US012758849B2

(12) United States Patent
Almes et al.

(10) Patent No.: US 12,758,849 B2
(45) Date of Patent: Oct. 13, 2026

(54) SPORTS FITTING BAY

(71) Applicant: Dick's Sporting Goods, Inc., Coraopolis, PA (US)

(72) Inventors: Scott B. Almes, Coraopolis, PA (US); Rob Brown, Coraopolis, PA (US)

(73) Assignee: DICK'S SPORTING GOODS, INC., Coraopolis, PA (US)

(*) Notice: Subject to any disclaimer, the term of this patent is extended or adjusted under 35 U.S.C. 154(b) by 175 days.

(21) Appl. No.: 18/750,871

(22) Filed: Jun. 21, 2024

(65) Prior Publication Data

US 2024/0424378 A1 Dec. 26, 2024

Related U.S. Application Data

(60) Provisional application No. 63/522,671, filed on Jun. 22, 2023.

(51) Int. Cl.

| | |
|---|---|
| ***A63B 71/06*** | (2006.01) |
| ***A63B 24/00*** | (2006.01) |
| ***G06V 10/22*** | (2022.01) |
| ***G06V 40/20*** | (2022.01) |
| *A63B 102/18* | (2015.01) |

(52) U.S. Cl.

CPC ...... *A63B 71/0622* (2013.01); *A63B 24/0062* (2013.01); *G06V 10/22* (2022.01); *G06V 40/20* (2022.01); *A63B 2071/065* (2013.01); *A63B 2102/18* (2015.10); *A63B 2102/182* (2015.10); *A63B 2220/05* (2013.01); *A63B 2220/807* (2013.01); *A63B 2243/0025* (2013.01)

(58) Field of Classification Search

CPC ............ A63B 71/0622; A63B 24/0062; A63B 2102/18; A63B 2102/182; A63B 2071/065; A63B 2220/05; A63B 2220/807; A63B 2243/0025; G06V 10/22; G06V 40/20

See application file for complete search history.

(56) References Cited

U.S. PATENT DOCUMENTS 6,565,448 B2 * 5/2003 Cameron ............. A63B 53/007 473/409
8,387,084 B1 * 2/2013 Klappert ............ H04N 21/6582 380/258

(Continued)

OTHER PUBLICATIONS

4D Motion Sports, "4D Motion," retrieved from https://4dmotionsports.com/baseball-pro/ on Aug. 8, 2022, 5 pgs.

(Continued)

*Primary Examiner* — Malina D. Blaise
(74) *Attorney, Agent, or Firm* — Foley & Lardner LLP

(57) ABSTRACT

A system can include one or more memory devices that can store instructions. The instructions can, when executed by one or more processors, cause the one or more processors to receive an indication of a selection of a plurality of pieces of sports equipment, provide a first prompt to initiate execution of a plurality of interactions between a user and an object, receive a first set of data corresponding to the plurality of interactions identify one or more images associated with the plurality of interactions, execute a Machine Learning (ML) model to apply bounding boxes to one or more objects included in the one or more images, determine one or more aspects of the plurality of interactions, and generate a performance metric for the plurality of interactions.

20 Claims, 20 Drawing Sheets

(56) References Cited

U.S. PATENT DOCUMENTS

| | | | | |
|---|---|---|---|---|
| 9,409,081 | B2 * | 8/2016 | Jensen | H04N 21/8133 |
| 9,851,374 | B2 | 12/2017 | Clark et al. | |
| 10,248,985 | B2 * | 4/2019 | Rohr | G06Q 30/0631 |
| 10,350,455 | B2 * | 7/2019 | Bentley | A61B 5/11 |
| 10,380,409 | B2 | 8/2019 | Thornbrue et al. | |
| 10,478,689 | B2 * | 11/2019 | Brekke | A63B 71/0622 |
| 10,786,728 | B2 | 9/2020 | Haas et al. | |
| 10,888,735 | B2 | 1/2021 | Clark et al. | |
| 10,974,121 | B2 | 4/2021 | Thornbrue et al. | |
| 11,426,629 | B2 * | 8/2022 | Thomas | G16H 20/30 |
| 11,648,443 | B2 * | 5/2023 | Wycoff | A63B 69/36<br>473/409 |
| 11,887,174 | B2 * | 1/2024 | Rohr | G06Q 30/0631 |
| 11,935,330 | B2 * | 3/2024 | Lee | G06V 40/23 |
| 12,008,839 | B2 * | 6/2024 | Menaker | G06V 10/62 |
| 2003/0008731 | A1 * | 1/2003 | Anderson | A63B 60/42<br>473/407 |
| 2013/0173389 | A1 * | 7/2013 | Page | G06Q 30/02<br>705/26.5 |
| 2013/0231590 | A1 * | 9/2013 | Corbett | A61B 5/112<br>600/595 |
| 2017/0001072 | A1 * | 1/2017 | Brekke | G16H 20/30 |
| 2017/0274256 | A1 * | 9/2017 | Brekke | A63B 60/42 |
| 2019/0114690 | A1 * | 4/2019 | Paquette | G06Q 30/0631 |
| 2019/0358492 | A1 * | 11/2019 | Coza | G09B 19/0038 |
| 2020/0298057 | A1 * | 9/2020 | Wycoff | G06V 40/23 |
| 2022/0023730 | A1 | 1/2022 | Howenstein et al. | |
| 2022/0379167 | A1 * | 12/2022 | Lee | G06V 40/23 |
| 2023/0356029 | A1 * | 11/2023 | Larsen | A63B 24/0021 |
| 2024/0424377 | A1 * | 12/2024 | Almes | G09B 19/0038 |
| 2025/0315648 | A1 * | 10/2025 | Lucey | G06N 3/0475 |

OTHER PUBLICATIONS

Batspeed Recon, "Train with Confidence," retrieved from https://batspeedrecon.com/ on Oct. 7, 2022, 9 pgs.

Better Baseball, "Baseball Bat Fitting," retrieved from https://betterbaseball.com/baseball-bat-fitting, Nov. 7, 2021, 4 pgs.

Blast Motion, "3D Bat Swing Tracer: Blast Baseball and Blast Softball 4.3 Update," retrieved from https://blastmotion.com/blog/3d-bat-swing-tracer-baseball-softball/ on Oct. 29, 2024, 5 pgs.

Blast Motion, "Blast Baseball Swing Analyzer," retrieved from https://blastmotion.com/products/baseball/ on Nov. 26, 2022, 5 pgs.

Blast Motion, "How to Use Swing Data for Bat Fitting," retrieved from https://blastmotion.com/blog/how-to-use-swing-data-for-bat-fitting on Oct. 29, 2024, 3 pgs.

C-Motion, Inc., "Biomechanics Research Tools," retrieved from https://c-motion.com/ on Nov. 21, 2022, 14 pgs.

Driveline Baseball, "Bat Fitting: How to Choose a Bat," Sep. 21, 2021, retrieved from https://www.drivelinebaseball.com/2021/09/how-were-using-science-to-make-sure-the-bat-you-swing-is-helping-your-performance/ on Oct. 29, 2024, 12 pgs.

Driveline Baseball, "Driveline Blog," retrieved from https://www.drivelinebaseball.com/ on Nov. 28, 2022, 7 pgs.

Gears Sports, "Gears Baseball Biomechanics," retrieved from https://www.gearssports.com/baseball-biomechanics/ on Oct. 29, 2024, 5 pgs.

HitTrax, "HitTrax—Redefining," retrieved from https://www.hittrax.com/ on Nov. 2, 2022, 10 pgs.

KinaTrax, "KinaTrax Motion Capture," retrieved from https://www.kinatrax.com/kinatrax-motion-capture/ on Oct. 29, 2024, 7 pgs.

* cited by examiner

205

FIG. 7
CLEAT FITTING
STEP 1
Input athlete information
STEP 2
Complete drill
STEP 3
Compare cleat performance
SCAN YOUR FIRST PAIR
Having trouble scanning?
Enter the shoes manually?
CALL FOR HELP

FIG. 10
CLEAT FITTING
STEP 1
Input athlete information
STEP 2
Complete drill
STEP 3
Compare cleat performance
To help you find the right cleats, we need to get to know you a bit better first.
CONTINUE
CALL FOR HELP

FIG. 11
CLEAT FITTING
STEP 1
Input athlete information
STEP 2
Complete drill
STEP 3
Compare cleat performance
2
3
What's your experience level?
Beginner
I'm new to the sport and/or need help figuring out what cleats to try out
Experienced
I've been playing for a few years and/or I have an idea of what cleats I want to try out.
CALL FOR HELP

SPORTS FITTING BAY

CROSS-REFERENCE TO RELATED PATENT APPLICATIONS

This application claims the benefit of and priority to U.S. Provisional Patent Application No. 63/522,671, filed on Jun. 22, 2023, the entirety of which is incorporated by reference herein.

BACKGROUND

Sporting equipment can include various equipment types and the various equipment types can include one or more characteristics.

SUMMARY

At least one embodiment relates to a sports bay. The sports bay can include a terminal. The terminal can include one or more memory devices. The one or more memory devices can store instructions thereon. The instructions can, when executed by one or more processors, cause the one or more processors to receive, from a display of the terminal, an indication of a selection of a plurality of pieces of sports equipment. The indication can include information to identify the plurality of pieces of sports equipment. The instructions can cause the one or more processors to provide, via the display of the terminal, a first prompt to initiate execution of a plurality of interactions between an object and a user. The user can use at least one piece of sports equipment of the plurality of pieces of sports equipment to execute the plurality of interactions. The instructions can cause the one or more processors to receive, from a camera responsive to execution of the plurality of interactions, a first set of data corresponding to the plurality of interactions. The instructions can cause the one or more processors to identify, from the first set of data, one or more images associated with the plurality of interactions. The instructions can cause the one or more processors to execute a Machine Learning (ML) model to apply bounding boxes to one or more objects included in the one or more images. The instructions can cause the one or more processors to determine, by the ML model responsive to application of the bounding boxes, one or more aspects of the plurality of interactions. The instructions can cause the one or more processors to generate, using the one or more aspects, a performance metric for the plurality of interactions.

In some embodiments, the instructions can cause the one or more processors to provide, via the display of the terminal, a message including the performance metric for the plurality of interactions. The instructions can cause the one or more processors to receive, from the display of the terminal, a second indication of a selection of a given piece of sports equipment of the plurality of pieces of sports equipment. The instructions can cause the one or more processors to provide, via the display of the terminal responsive to receipt of the second indication, a graphical representation of one or more interactions of the plurality of interactions that pertain to the given piece of sports equipment of the plurality of pieces of sports equipment.

In some embodiments, determine, by the ML model responsive to application of the bounding boxes, the one or more aspects of the plurality of interactions can include identifying, based on the one or more images, one or more positions of the user, wherein the one or more positions of the user pertain to the plurality of interactions. In some embodiments, determine, by the ML mode responsive to application of the bounding boxes, the one or more aspects of the plurality of interactions can include comparing the one or more positions of the user with a plurality of predetermined positions. In some embodiments, determine, by the ML mode responsive to application of the bounding boxes, the one or more aspects of the plurality of interactions can include detecting, responsive to comparing the one or more positions of the user with the plurality of predetermined positions, one or more given interactions of the plurality of interactions. In some embodiments, determine, by the ML mode responsive to application of the bounding boxes, the one or more aspects of the plurality of interactions can include associating, based on the bounding boxes, the one or more given interactions of the plurality of interactions with one or more positions of the object.

In some embodiments, generate, using the one or more aspects, the performance metric for the plurality of interactions can include determining, based on the bounding boxes, points of contact between the user and the object pertaining to the plurality of interactions. In some embodiments, generate, using the one or more aspects, the performance metric for the plurality of interactions can include identifying, based on the points of contact, a first amount of given interactions of the plurality of interactions that exceed a predetermined threshold and a second amount of given interactions of the plurality of interactions below the predetermined threshold. In some embodiments, generate, using the one or more aspects, the performance metric for the plurality of interactions can include determining, based on the first amount of given interactions and the second amount of given interactions, one or more scores for the plurality of interactions.

In some embodiments, the instructions can cause the one or more processors to receive, via the display of the terminal, a second indication of a selection of a given mode of a plurality of modes of the sports bay. The instructions can cause the one or more processors to determine, responsive to receipt of the second indication, current operating parameters of the camera. The instructions can cause the one or more processors to update the current operating parameters of the camera based on the selection of the given mode.

In some embodiments, the instructions can cause the one or more processors to determine, responsive to selection of a given mode of a plurality of modes of the sports bay, one or more changes to current operating parameters of the camera for use in capturing the plurality of interactions. The instructions can cause the one or more processors to receive, responsive to the camera capturing the plurality of interactions, information pertaining to the plurality of interactions.

In some embodiments, the instructions can cause the one or more processors to evaluate, while the user performs the plurality of interactions based on information obtained by the camera, one or more characteristics of the user associated with the performance metric for the plurality of interactions. The instructions can cause the one or more processors to generate, responsive to evaluation of the one or more characteristics, a recommendation for a second plurality of pieces of sports equipment. The second plurality of pieces of sports equipment can include the at least one piece of sports equipment used by the user and at least one second piece of sports equipment to adjust the one or more characteristics of the user.

In some embodiments, the at least one piece of sports equipment used by the user can include at least one of soccer cleats or a net. The object can include a soccer ball.

In some embodiments, the camera can be disposed proximate to the sports bay, and the camera can be adjustable between operating parameters based on signals provided by the one or more processors.

At least one embodiment relates to a system. The system can include one or more memory devices. The one or more memory devices can store instructions thereon. The instructions can, when executed by one or more processors, cause the one or more processors to receive, from a display of a first device, an indication of a selection of a plurality of pieces of sports equipment. The indication can include information to identify the plurality of pieces of sports equipment. The instructions can cause the one or more processors to provide, via the display of the first device, a first prompt to initiate execution of a plurality of interactions between an object and a user. The user can use at least one piece of sports equipment of the plurality of pieces of sports equipment to execute the plurality of interactions. The instructions can cause the one or more processors to receive, from a second device responsive to execution of the plurality of interactions, a first set of data corresponding to the plurality of interactions. The instructions can cause the one or more processors to identify, from the first set of data, one or more images associated with the plurality of interactions. The instructions can cause the one or more processors to execute a Machine Learning (ML) model to apply bounding boxes to one or more objects included in the one or more images. The instructions can cause the one or more processors to determine, by the ML model responsive to application of the bounding boxes, one or more aspects of the plurality of interactions. The instructions can cause the one or more processors to generate, using the one or more aspects, a performance metric for the plurality of interactions.

In some embodiments, the instructions can cause the one or more processors to provide, via the display of the first device, a message including the performance metric for the plurality of interactions. The instructions can cause the one or more processors to receive, from the display of the first device, a second indication of a selection of a given piece of sports equipment of the plurality of pieces of sports equipment. The instructions can cause the one or more processors to provide, via the display of the first device responsive to receipt of the second indication, a graphical representation of one or more interactions of the plurality of interactions that pertain to the given piece of sports equipment of the plurality of pieces of sports equipment.

In some embodiments, determine, by the ML model responsive to application of the bounding boxes, the one or more aspects of the plurality of interactions can include identifying, based on the one or more images, one or more positions of the user, wherein the one or more positions of the user pertain to the plurality of interactions. In some embodiments, determine, by the ML model responsive to application of the bounding boxes, the one or more aspects of the plurality of interactions can include comparing the one or more positions of the user with a plurality of predetermined positions. In some embodiments, determine, by the ML model responsive to application of the bounding boxes, the one or more aspects of the plurality of interactions can include detecting, responsive to comparing the one or more positions of the user with the plurality of predetermined positions, one or more given interactions of the plurality of interactions. In some embodiments, determine, by the ML model responsive to application of the bounding boxes, the one or more aspects of the plurality of interactions can include associating, based on the bounding boxes, the one or more given interactions of the plurality of interactions with one or more positions of the object.

In some embodiments, generate, using the one or more aspects, the performance metric for the plurality of interactions can include determining, based on the bounding boxes, points of contact between the user and the object pertaining to the plurality of interactions. In some embodiments, generate, using the one or more aspects, the performance metric for the plurality of interactions can include identifying, based on the points of contact, a first amount of given interactions of the plurality of interactions that exceed a predetermined threshold and a second amount of given interactions of the plurality of interactions below the predetermined threshold. In some embodiments, generate, using the one or more aspects, the performance metric for the plurality of interactions can include determining, based on the first amount of given interactions and the second amount of given interactions, one or more scores for the plurality of interactions.

In some embodiments, the instructions can cause the one or more processors to receive, via the display of the first device, a second indication of a selection of a given mode of a plurality of modes of a sports bay. The instructions can cause the one or more processors to determine, responsive to receipt of the second indication, current operating parameters of the second device. The instructions can cause the one or more processors to update the current operating parameters of the second device based on the selection of the given mode.

In some embodiments, the instructions can cause the one or more processors to determine, responsive to selection of a given mode of a plurality of modes of a sports bay, one or more changes to current operating parameters of the second device for use in capturing the plurality of interactions. The instructions can cause the one or more processors to receive, responsive to the second device capturing the plurality of interactions, information pertaining to the plurality of interactions.

In some embodiments, the instructions can cause the one or more processors to evaluate, while the user performs the plurality of interactions based on information obtained by the second device, one or more characteristics of the user associated with the performance metric for the plurality of interactions. The instructions can cause the one or more processors to generate, responsive to evaluation of the one or more characteristics, a recommendation for a second plurality of pieces of sports equipment. The second plurality of pieces of sports equipment can include the at least one piece of sports equipment used by the user and at least one second piece of sports equipment to adjust the one or more characteristics of the user.

At least one embodiment relates to a terminal. The terminal can be for a sports bay. The terminal can include one or more memory devices. The one or more memory devices can store instructions thereon. The instructions can, when executed by one or more processors, cause the one or more processors to receive, from a display of the terminal, an indication of a selection of a plurality of pieces of soccer equipment. The indication can include information to identify the plurality of pieces of soccer equipment. The plurality of pieces of soccer equipment can include at least one of soccer cleats, a soccer ball, or a net. The instructions can cause the one or more processors to provide, via the display of the terminal, a first prompt to initiate execution of a plurality of interactions between an object and a user. The user can use at least one piece of soccer equipment of the plurality of pieces of soccer equipment to execute the plurality of interactions. The instructions can cause the one or more processors to receive, from a camera responsive to execution of the plurality of interactions, a first set of data corresponding to the plurality of interactions. The instructions can cause the one or more processors to determine, by a machine learning model responsive to application of bounding boxes, one or more aspects of the plurality of interactions. The instructions can cause the one or more processors to generate, using the one or more aspects, a performance metric for the plurality of interactions.

In some embodiments, the instructions can cause the one or more processors to provide, via the display of the terminal, a message including the performance metric for the plurality of interactions. The instructions can cause the one or more processors to receive, from the display of the terminal, a second indication of a selection of a given piece of soccer equipment of the plurality of pieces of soccer equipment. The instructions can cause the one or more processors to provide, via the display of the terminal responsive to receipt of the second indication, a graphical representation of one or more interactions of the plurality of interactions that pertain to the given piece of soccer equipment of the plurality of pieces of soccer equipment.

In some embodiments, determine, by the machine learning model responsive to application of the bounding boxes, the one or more aspects of the plurality of interactions can include identifying, based on one or more images captured by the camera, one or more positions of the user, wherein the one or more positions of the user pertain to the plurality of interactions. In some embodiments, determine, by the machine learning model responsive to application of the bounding boxes, the one or more aspects of the plurality of interactions can include comparing the one or more positions of the user with a plurality of predetermined positions. In some embodiments, determine, by the machine learning model responsive to application of the bounding boxes, the one or more aspects of the plurality of interactions can include detecting, responsive to comparing the one or more positions of the user with the plurality of predetermined positions, one or more given interactions of the plurality of interactions. In some embodiments, determine, by the machine learning model responsive to application of the bounding boxes, the one or more aspects of the plurality of interactions can include associating, based on the bounding boxes, the one or more given interactions of the plurality of interactions with one or more positions of the object.

In some embodiments, the instructions can cause the one or more processors to receive, via the display of the terminal, a second indication of a selection of a given mode of a plurality of modes of the sports bay. The instructions can cause the one or more processors to determine, responsive to receipt of the second indication, current operating parameters of the camera. The instructions can cause the one or more processors to update the current operating parameters of the camera based on the selection of the given mode.

At least one embodiment relates to a system. The system can include one or more memory devices. The one or more memory devices can store instructions. The instructions can, when executed by one or more processors, cause the one or more processors to receive, from a first device, a first indication of a selection of a plurality of pieces of sports equipment, the first indication including information to identify the plurality of pieces of sports equipment. The instructions can also cause the one or more processors to provide, to the first device, a first prompt to initiate execution of a plurality of interactions between a user and an object, wherein the user utilizes at least one piece of sports equipment of the plurality of pieces of sports equipment to execute the plurality of interactions. The instructions can also cause the one or more processors to receive, from a second device responsive to execution of the plurality of interactions, a first set of data corresponding to the plurality of interactions. The instructions can also cause the one or more processors to identify, from the first set of data, one or more images associated with the plurality of interactions. The instructions can also cause the one or more processors to execute a Machine Learning (ML) model to apply bounding boxes to one or more objects included in the one or more images. The instructions can also cause the one or more processors to determine, by the ML model responsive to application of the bounding boxes, one or more aspects of the plurality of interactions, and generate, using the one or more aspects, a performance metric for the plurality of interactions.

In some embodiments, the instructions can also cause the one or more processors to provide, to the first device, a message including the performance metric for the plurality of interactions. The instructions can also cause the one or more processors to receive, from the first device, a second indication of a selection of a given piece of sports equipment of the plurality of pieces of sports equipment, and provide, to the first device responsive to receipt of the second indication, a graphical representation of one or more interactions of the plurality of interactions that pertain to the given piece of sports equipment of the plurality of pieces of sports equipment.

In some embodiments, the one or more processors can determine, by the ML model responsive to application of the bounding boxes, the one or more aspects of the plurality of interactions by identifying, based on the one or more images, one or more positions of the user, wherein the one or more positions of the user pertain to the plurality of interactions. The one or more processors can also determine, by the ML model responsive to application of the bounding boxes, the one or more aspects of the plurality of interactions by comparing the one or more positions of the user with a plurality of predetermined positions. The one or more processors can also determine, by the ML model responsive to application of the bounding boxes, the one or more aspects of the plurality of interactions by detecting, responsive to comparing the one or more positions of the user with the plurality of predetermined positions, one or more given interactions of the plurality of interactions, and associating, based on the bounding boxes, the one or more given interactions of the plurality of interactions with one or more positions of the object.

In some embodiments, the one or more processors can generate, using the one or more aspects, the performance metric for the plurality of interactions by determining, based on the bounding boxes, points of contact between the user and the object pertaining to the plurality of interactions. The one or more processors can also generate, using the one or more aspects, the performance metric for the plurality of interactions by identifying, based on the points of contact, a first amount of given interactions of the plurality of interactions that exceed a predetermined threshold and a second amount of given interactions of the plurality of interactions below the predetermined threshold, and determining, based on the first amount of given interactions and the second amount of given interactions, one or more scores for the plurality of interactions.

At least one embodiment relates to a terminal for use in a sports bay. The terminal can include one or more processing circuits. The one or more processing circuits can receive, via a display of the terminal, a first indication of a selection of a given mode of a plurality of modes of the sports bay. The one or more processing circuits can also determine, responsive to receipt of the first indication, current operating parameters of a camera disposed proximate to the sports bay. The one or more processing circuits can also determine, based on a plurality of interactions of the given mode, one or more changes to the current operating parameters for use in capturing the plurality of interactions. The one or more processing circuits can also update the current operating parameters to reflect the one or more changes. The one or more processing circuits can also receive, responsive to the camera capturing the plurality of interactions, information pertaining to the plurality of interactions. The one or more processing circuits can also identify, from the information pertaining the plurality of interactions, one or more images associated with the plurality of interactions. The one or more processing circuits can also execute a Machine Learning (ML) model to apply bounding boxes to one or more objects included in the one or more images, and determine, by the ML model responsive to application of the bounding boxes, one or more aspects of the plurality of interactions.

At least one embodiment relates to a system. The system can include one or more memory devices. The one or more memory devices can store instructions. The instructions can, when executed by one or more processors, cause the one or more processors to receive, from a first device, an indication of a selection of a plurality of pieces of soccer equipment, the indication including information to identify the plurality of pieces of soccer equipment. The instructions can also cause the one or more processors to provide, to the first device, a prompt to initiate performance of a plurality of soccer moves by a user, wherein the user utilizes at least one piece of soccer equipment of the plurality of pieces of soccer equipment while performing the plurality of soccer moves. The instructions can also cause the one or more processors to evaluate, while the user performs the plurality of soccer moves based on information obtained by a second device, one or more characteristics of the user associated with the performance of the plurality of soccer moves by the user, and generate, responsive to evaluation of the one or more characteristics, a recommendation for a second plurality of pieces of soccer equipment, the second plurality of pieces of soccer equipment including the at least one piece of soccer equipment utilized by the user and at least one second piece of soccer equipment to adjust the one or more characteristics of the user.

In some embodiments, the at least one piece of soccer equipment utilized by the user can include at least one of soccer cleats, a soccer ball, or a net.

DETAILED DESCRIPTION

Figure 1:
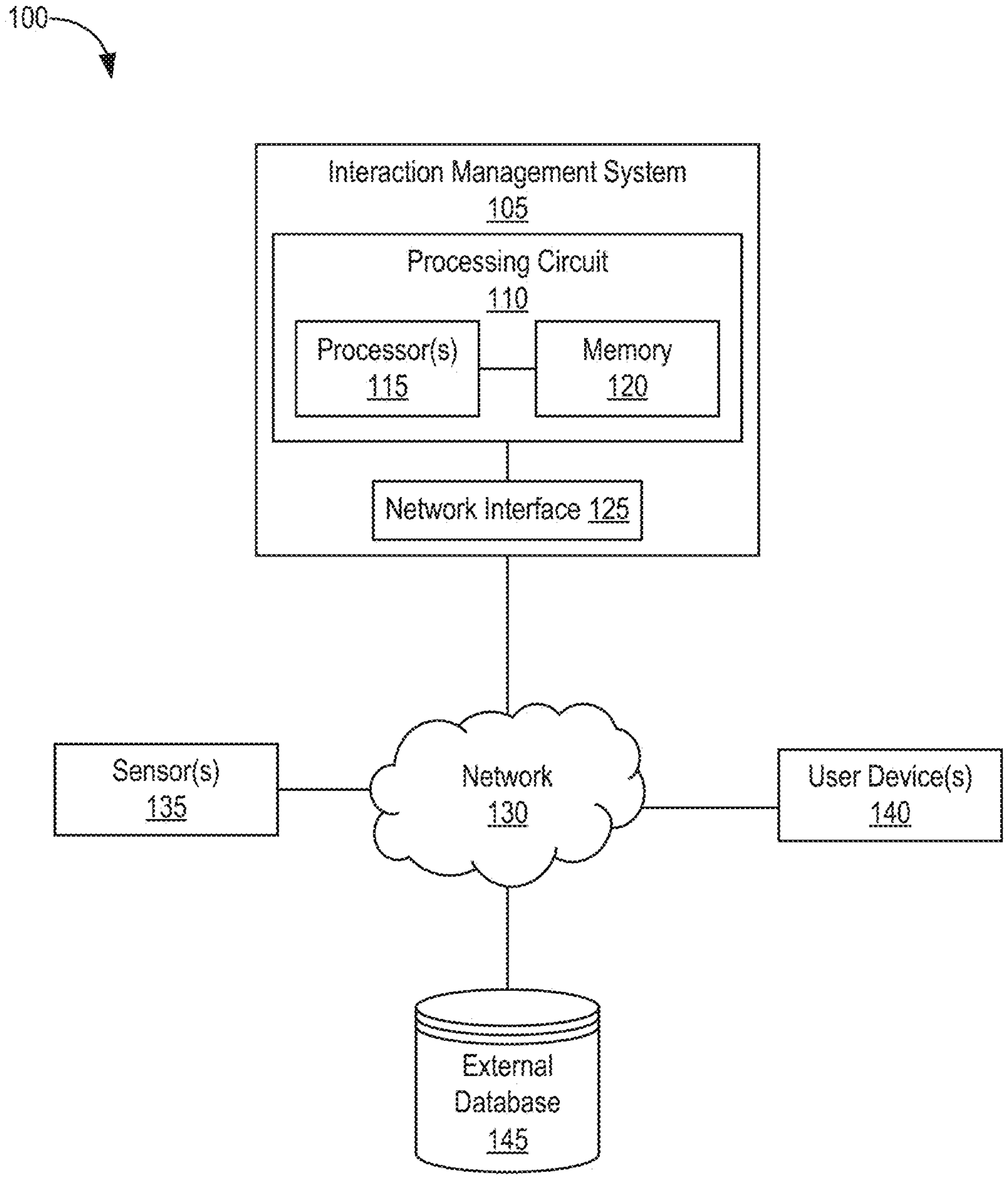
FIG. 1 is a block diagram of a system for managing interactions within a flexible sports bay, according to some embodiments.

The systems and methods described herein relate to a flexible sports bay that may assist users in selecting pieces of sporting equipment and/or providing virtual and/or remote training sessions for one or more sports. For example, a flexible sports bay may include enclosures (e.g., netting, partitions, walls, batting cages, etc.) and electrical devices (e.g., sensors, cameras, monitors, kiosk, laptops, etc.) may be disposed within and/or proximate to the enclosures. The netting can enclose, define, and/or otherwise establish an area of the flexible sports bay. The electrical devices may capture user interactions within the flexible sports bay (e.g., the area enclosed by the netting). For example, a camera can capture and/or record a user kicking a soccer ball. The information captured by the camera (e.g., information about the user kicking the soccer ball) may be provided to a computer system for processing. The computer system can identify one or more aspects of the user interactions. For example, the computer system can identify various pieces of sporting equipment that were used during the interactions. The computer system can identify at least one of a baseball bat, a softball bat, sports cleats, and/or among various combinations. For example, the computer system can identify a given model number or a given model type for a pair of soccer cleats that were worn by an individual during the user interactions.

The computer system can also group, organize, and/or otherwise track user interactions based on a type and/or piece of sporting equipment. For example, a user may perform a given number of user interactions (e.g., one or more soccer kicks and/or one or more soccer ball touches) and the computer system can associate the user interactions with soccer cleats (e.g., kicks 1, 2, and 3 were performed while wearing soccer cleats 1 and kicks 4, 5, and 6 were performed while wearing soccer cleats 2). The computer system can generate performance metrics for each grouping of user interactions (e.g., a first grouping including the kicks using soccer cleats 1 and a second grouping including the kicks using soccer cleats 2).

As another example, a user may perform one or more soccer drills (e.g., user interactions) and the computer system can associate the soccer drills with given soccer cleats (e.g., drill 1 was performed wearing soccer cleats 1 and drill 2 was performed wearing soccer cleats 2). The computer system can generate performance metrics for each grouping of drills (e.g., a first grouping including metrics associated with the user wearing the soccer cleats 1 and a second grouping including metrics associated with the user wearing the soccer cleats 2).

FIG. 1 is a block diagram of a system 100 for managing interactions within a flexible sports bay, according to some embodiments. The system 100 and/or a component thereof may be implemented by the computer system described herein to provide some of the technical solutions described herein. Each system and/or component of the system 100 can include one or more processors, memory, network interfaces, communication interfaces, and/or user interfaces. Memory can store programming logic that, when executed by the processor, implements, controls, and/or otherwise directs the operation of the corresponding computing system or device. Memory can also store data in databases. The network interfaces can allow the systems and/or components of the system 100 to communicate wirelessly. The communication interfaces can include wired and/or wireless communication interfaces and the systems and/or components of the system 100 can be connected via the communication interfaces. The various components in the system 100 can be implemented via hardware (e.g., circuitry), software (e.g., executable code), or any combination thereof. Systems, devices, and components in FIG. 1 can be added, deleted, integrated, separated, and/or rearranged.

The system 100 can include at least one interaction management system 105, at least one network 130, at least one sensor 135, at least one user device 140, and at least one external database 145. The network 130 can be and/or include a local area network (LAN), wide area network (WAN), telephone network (such as the Public Switched Telephone Network (PSTN)), Controller Area Network (CAN), wireless link, intranet, the Internet, a cellular network, and/or combinations thereof. The network 130 may allow for the interaction management system 105, the sensors 135, the user devices 140, and/or the external database 145 to interact with and/or otherwise interface with one another. The user devices 140 can be and/or include at least one of a kiosk, a mobile computing device, a desktop computer, a smartphone, a tablet, a smart watch, and/or any other device that can facilitate providing, receiving, displaying and/or otherwise interacting with content (e.g., images, video, audio, text, etc.). In some embodiments, the user device 140 is a kiosk and an operator and/or user can interact with the kiosk to provide and receive information from the interaction management system 105. In some embodiments, the user device 140 may store or maintain an application that includes instructions that, when executed by the user device 140, cause the user device 140 to perform one or more operations similar to that of the interaction management system 105. For example, the user device 140 may store instructions that causes the user device 140 to control the sensors 135. As another example, the user device 140 may store instructions that cause the user device 140 to display a prompt for the user to perform one or more interactions.

In some embodiments, the interaction management system 105, the sensors 135, and the user devices 140 can interface with, interact with, and/or otherwise communicate with another via one or more additional and/or separate networks to that of the network 130. For example, the sensors 135 and the interaction management system 105 can be directly coupled and/or connected to another and the sensors 135 can communicate, via wired communication, with the interaction management system 105. As another example, the sensors 135 can communicate with the user devices 140 via one or more wireless communications (e.g., Bluetooth, CAN, wi-fi, etc.).

The interaction management system 105 can include at least one processing circuit 110 and at least one network interface 125. In some embodiments, the interaction management system 105 can be housed and/or located within a terminal and/or a kiosk of the flexible sports bay. In some embodiments, the terminal housing the interaction management system 105 can be directly coupled and/or directly connected to the sensors 135 and/or the user devices 140 and the terminal can communicate, via wired communication, with at least one of the sensors 135 and/or the user devices 140. The interaction management system 105 can be distributed across one or more servers, one or more cloud computing devices, and/or among other possible remote devices and/or data centers.

The processing circuit 110 can include at least one processor 115 and memory 120. Memory 120 can be one or more devices (e.g., RAM, ROM, Flash memory, hard disk storage) for storing data. Memory 120 can also store computer code and/or instructions for executing, completing and/or facilitating the various processes described herein. For example, memory 120 may store instructions and the instructions may cause the processors 115 to perform functionality similar to that of the interaction management system 105 and/or a component thereof. Memory 120 can be or include non-transient volatile memory, non-volatile memory, and non-transitory computer storage media. Memory 120 can include database components, object code components, script components, or any other type of information structure for supporting the various activities and information structures described herein. Memory 120 can be communicably coupled with the processors 115. Memory 120 can also be electrically coupled with the processors 115. The processors 115 can be implemented as one or more application specific integrated circuits (ASICs), one or more field programmable gate arrays (FPGAs), a group of processing components, and/or other suitable electronic processing components.

The network interface 125 can be and/or include network communication devices, network interfaces, and/or other possible communication interfaces. The network interface 125 can be and/or include wired or wireless communications interfaces (e.g., jacks, antennas, transmitters, receivers, transceivers, wire terminals, etc.) for conducting data communications between the interaction management system 105, the sensors 135, the user devices 140, and/or the external database 145. The network interface 125 can be direct (e.g., local wired or wireless communications) and/or via a communications network (e.g., the network 130). For example, the network interface 125 can include an Ethernet card and port for sending and receiving data via an Ethernet-based communications link or network. The network interface 125 can also include a Wi-Fi transceiver for communicating via a wireless communications network (e.g., the network 130). The network interface 125 can include a power line communications interface. The network interface 125 can include an Ethernet interface, a USB interface, a serial communications interface, and/or a parallel communications interface. The network interface 125 can interface with, interact with and/or otherwise communicate with at least one of various systems and/or components described herein.

The sensors 135 can be housed, positioned, located, and/or other placed within and/or proximate to the flexible sports bay. The sensors 135 can be and/or include at least one of cameras, motion detectors, radar sensors, video devices, object tracking equipment, position sensors, computer vision equipment, objection detection devices, and/or various combinations thereof. The sensors 135 can collect, record, obtain, and/or otherwise capture user interactions within the sports bay. For example, the sensors 135 can capture images, video, and/or data associated with a user swinging a baseball bat within the flexible sports bay. The sensors 135 can include at least one of various modes, various configurations, various functionality, various setups, and/or among possible combination. The various modes of the sensors 135 may enable the sensors 135 to perform various services and/or capture various types of user interactions. For example, the flexible sports bay can include the sensors 135 and the sensors 135 can be controlled, by the interaction management system 105, to switch from a first mode (e.g., baseball bat selection and/or bat fitting mode) to a second mode (e.g., soccer cleat selection mode). The modularity and/or configuration of the components of the flexible sports bay (e.g., the sensors 135 and the interaction management system 105) can result in the flexible sports bay providing a multiple use area with minimal downtime between various services. In some implementations, the mode may be switched automatically responsive to detecting characteristics of the type of sport or the activity being performed (e.g., switched between a baseball mode and a soccer mode responsive to the cameras identifying a baseball bat or a second ball in the bay, within the hands or proximate to a foot of a user, etc.)

The external database 145 can be distributed across one or more servers, one or more cloud computing devices, and/or among other possible remote devices and/or data centers. The external database 145 can house, store, keep, maintain, and/or otherwise hold at least one of equipment inventory, equipment specification sheets, equipment types, sporting requirements, purchase records, online registers, and/or among various combinations. The external database 145 can communicate with at least one of the interaction management system 105, the sensors 135, and/or the user devices 140. The external database 145 can store, keep, maintain, and/or otherwise hold information that is received from components of the system 100. For example, the external database 145 can store information associated with a user interaction with the flexible sports bay.

The interaction management system 105 can receive an indication of a selection of a plurality of pieces of sports equipment. For example, the interaction management system 105 can be housed within a terminal and the interaction management system 105 can receive the indication responsive to an operator and a user of the terminal interacting with a display of the terminal (e.g., selecting icons on a user interface presented via the display). The indication can include information to identify the plurality of pieces of equipment. For example, the pieces of sports equipment can be baseball bats and the indication may include model numbers for the baseball bats.

The interaction management system 105 can provide a prompt to initiate execution of a plurality of interactions between a user and an object. For example, the interaction management system 105 can generate, create, and/or otherwise provide a user interface including a prompt and the prompt can be provide via the display of the terminal. The plurality of interactions between the user and the object can be or include at least one of a user hitting a baseball (e.g., the object), the user performing drills with a soccer ball (e.g., the object), the user partaking in a lesson (e.g., a hitting lesson), and/or among various other possible interactions.

The interaction management system 105 can receive data corresponding to one or more aspects of the plurality of interactions. For example, the interaction management system 105 can receive data collected, generated, and/or otherwise obtained by the sensors 135. The data obtained by the sensors 135 can include performance metrics associated with the user interactions. For example, if the user interactions were the user hitting a baseball, the performance metrics may include exit velocity, swing angle, bat speed, launch angle, and/or among various other possible performance metrics. As another example, if the user interactions were the user performing one or more soccer drills, the performance metrics may include a number of touches and/or contacts with the soccer ball, a time to completion of the drills, and/or among various other possible performance metrics.

The interaction management system 105 can identify information associated with at least one piece of sports equipment. For example, the interaction management system 105 can parse the information associated with the user interactions to determine which aspects pertain to given pieces of sports equipment. To continue this example, the user may have performed a given number of user interactions and each user interaction may have been performed using at least one piece of sports equipment. The interaction management system 105 can identify information that is associated with the pieces of sports equipment by grouping user interactions with given pieces of sports equipment.

The interaction management system 105 can determine a plurality of characteristics that indicate a performance of the user when utilizing the pieces of sports equipment. For example, the user interactions may have included the user performing 7 baseball swings (e.g., the user interacted with the baseball 7 times) and the baseball swings may have been performed with different baseball bats. To continue this example, the interaction management system 105 can use the groupings (e.g., which swings were performed with which baseball bat) to provide characteristics of the performance with the sports equipment (e.g., how did the user perform with the various baseball bats).

The interaction management system 105 can receive a user defined characteristic to indicate a performance of the pieces of sports equipment. For example, the user may input, via the terminal, an indication of the user's experience with each baseball bat (e.g., I enjoyed bat 1 and disliked bat 2). The user may also indicate that they did not experience any significant differences between the experiences.

The interaction management system 105 can provide a prompt to indicate selection of at least one piece of sports equipment. For example, the interaction management system 105 may provide, via the terminal, a user interface that includes the performance metrics with the pieces of sports equipment and the user interface may also identify which piece(s) of sports equipment that the user excelled with. The interaction management system 105 can receive, via the terminal, an indication of a selection of the pieces of sports equipment. For example, the indication can be that the user selected a given piece of sports equipment that was used by the user during the user interactions.

The interaction management system 105 can receive a request to initiate a session between one or more users. For example, the interaction management system 105 can receive, via a display on the terminal, a selection from a user to initiate a baseball lesson. The interaction management system 105 can receive a request for information associated with one of the users. For example, the interaction management system 105 can receive a request from a baseball coach for information from the user that provided the request to initiate the session.

The interaction management system 105 can provide a prompt for the information associated with the user. For example, the interaction management system 105 can provide, via a display of the terminal, a user interface that includes a prompt for the user to enter the information. The user can provide, enter, and/or otherwise indicate the information to the interaction management system 105. For example, the display may include a text box and the user can enter the information into the text box. As another example, the terminal may include a Quick Response (QR) code reader and/or scanner and the user can provide information via the QR code reader. The interaction management system 105 can provide the information provided by the user to a second user (e.g., the user that requested the information associated with the user).

The interaction management system 105 can receive an indication of a plurality of actions to be executed by the user. For example, the interaction management system 105 can receive one or more hitting drills and/or hitting exercises that the baseball coach would like for the user to complete. The interaction management system 105 can provide a visual representation of the plurality of actions. For example, the interaction management system 105 can provide, via the terminal, a user interface including at least one of images, videos, and/or illustrations of the plurality of actions.

The interaction management system 105 can receive data corresponding to one or more aspects of the plurality of actions. The interaction management system 105 can receive the data responsive to execution of the plurality of actions by the user. The interaction management system 105 can receive the data from the sensors 135. For example, the data may include images captures by the cameras showing the user executing the plurality of actions. The one or more aspects of the plurality of actions can indicate a performance of the first user. For example, the data may include the performance metrics described herein.

The interaction management system 105 can provide the data corresponding to the one or more aspects of the plurality of actions to a device. For example, the interaction management system 105 can provide the data to a user device 140 associated with the baseball coach. The data can be provided via a user interface displayed on the user device 140. The interaction management system 105 can receive a plurality of actions to be executed by the user to adjust a performance of the user. For example, the interaction management system 105 can receive the actions from the user device 140. The plurality of actions can be or include one or more follow up drills, one or more modifications to the previous executed actions, and/or one or more cues and/or further instructions for the user to perform.

The interaction management system 105 can receive an indication of a selection of a plurality of pieces of sports equipment. For example, the interaction management system 105 can be housed within and/or in communication with the terminal, and the interaction management system 105 can receive the indication responsive to an operator of the terminal selecting an icon of a user interface. The interaction management system 105 can receive the indication responsive to the interaction management system 105 providing, via the terminal, a user interface including one or more selectable icons and/or selectable elements. The indication, received by the interaction management system 105, can include information to identify the plurality of pieces of sports equipment. For example, the pieces of sports equipment can be and/or include soccer cleats and the indication can include model numbers for the soccer cleats.

The interaction management system 105 can provide a prompt to initiate execution of a plurality of interactions between a user and the object. For example, the interaction management system 105 can provide the prompt via a user interface displayed by the terminal. The execution of the plurality of interactions can be and/or include a user kicking a soccer ball, the user performing one or more soccer drills, the user performing one or more soccer activities, and/or various combinations thereof. The user can utilize at least one piece of sports equipment. For example, the user can wear a pair of soccer cleats and information pertaining to the soccer clears may have been provided to the interaction management system 105.

The interaction management system 105 can receive, responsive to execution of the plurality of interactions, a set of data corresponding to the plurality of interactions. For example, the sensors 135 can collection information (e.g., images, photos, videos, performance information, etc.) and the interaction management system 105 can receive, from the sensors 135, the set of data form the sensors 135.

The interaction management system 105 can identify, from the set of data, one or more images associated with the plurality of interactions. For example, the interaction management system 105 can identify images of the user that performed the plurality of interactions. The images can also include the object (e.g., the soccer ball) that the user interacted with. The interaction management system 105 can identify the one or more images by extracting, analyzing, and/or otherwise searching the information provided by the sensors 135 to detect information including images.

The interaction management system 105 can execute a Machine Learning (ML) model apply bounding boxes to one or more objects included in the one or more images. For example, the interaction management system 105 can apply bounding boxes to at least one of the soccer ball that was used during the user interactions, the user performing the user interactions, an area of the sports bay, and/or among various possible combinations. In some embodiments, the ML model may refer to and/or include one or more models trained using various techniques. For example, the ML model may be trained using supervised learning. As another example, the ML model may be trained using unsupervised learning. In some embodiments, the ML model may refer to and/or include at least one of linear regression models, decision tree models, random forest models, algorithmic models, neural networks, deep learning models, and/or other possible models.

The interaction management system 105 can determine, by the ML model responsive to application of the bounding boxes, one or more aspects of the plurality of interactions. For example, the interaction management system 105 can determine when the user touched (e.g., one or more aspects of the plurality of interactions) the soccer ball and where (e.g., what part of the user touched the soccer ball and/or what portion of the soccer ball was touched). The one or more aspects of the plurality of interaction can include at least one of a number of interactions (e.g., how many times the soccer ball was touch), a duration of the number of interactions (e.g., how long was each touch), a position and/or an orientation of the user as the user makes contact with the soccer ball (e.g., how is the user's leg positioned, how is the user's foot positioned, what portion of the user's foot makes contact with the soccer ball, etc.), and/or among various possible combinations and/or alternatives.

The interaction management system 105 can generate, using the one or more aspects, a performance metric for the plurality of interactions. For example, the interaction management system 105 can rank, score, quantify, and/or evaluate the one or more aspects to generate a performance of the interactions (e.g., how did the user perform in executing the interactions). The performance metric can be and/or include at least one of a time to completion of the interactions (e.g., how long did it take for the user to complete the interactions), a number of interactions (e.g., how many times did the user touch the soccer ball), a number of touches that exceed a predetermined criteria (e.g., how many times did the user touch a predetermined portion of the soccer ball), and/or among various possible combinations.

The interaction management system 105 can provide a message including the performance metric for the plurality of interactions. For example, the interaction management system 105 can generate, create, and/or otherwise present a user interface and the user interface can include the message. The user interface can be displayed by at least one of the terminal and/or the user devices 140.

The interaction management system 105 can receive an indication of a selection of a piece of sports equipment. The piece of sports equipment may have been used during the interactions (e.g., a pair of soccer cleats worn by the user while performing the interactions). The interaction management system 105 can receive the indication responsive to the user and/or operator of the terminal selecting an icon associated with the piece of sports equipment.

The interaction management system 105 can provide a graphical representation of one or more interactions that pertain to the piece of sports equipment. For example, the interaction management system 105 can generate and/or present a user interface and the user interface can include images, pictures, videos, and/or digital representations of interactions corresponding to the piece of sports equipment (e.g., images of the user kicking the soccer ball while wearing a given pair of soccer cleats). The graphical representation can also include a performance metric associated with and/or pertaining to when the user performed the interactions with the piece of sports equipment. In some embodiments, one or more of the devices described herein may display or otherwise present the graphical representations. For example, the terminal may display the graphical representations. As another example, a monitor located proximate to the sports bay may display the graphical representations. In some embodiments, a first device may receive one or more inputs or interactions via a display of the first device. For example, the terminal may receive one or more inputs via a display. In some embodiments, a second device may present information based on the inputs received by the first device. For example, a monitor located proximate to the sports bay may present graphical representations of one or more interactions with sports equipment.

The interaction management system 105 can determine the one or more aspects of the plurality of interactions by identifying, based on one or more images, one or more positions of a user. For example, the interaction management system 105 can use the ML model to determine a placement and/or a position of the user within the flexible sports bay. The interaction management system 105 can determine the placement of the user by detecting, identifying, and/or otherwise establishing where the user is located within the flexible sports bay. The one or more positions of the user can include a relative position of different portions of the user (e.g., the user left foot is being used as their support foot and the users right foot is being used as their kicking foot), a path taken by the user to move from a first portion of the flexible sports bay to a second portion of the flexible sports bay, and/or among various possible combinations and/or alternatives.

The interaction management system 105 can also determine the one or more aspects of the plurality of interactions by comparing the one or more positions of the user with a plurality of predetermined positions. For example, the interaction management system 105 can compare a placement of the user's support leg with one or more predetermined placements of user's support legs to determine when the user is getting ready to and/or in the process of kicking the soccer ball.

The interaction management system 105 can also determine the one or more aspects of the plurality of interactions by detecting interactions that were performed and/or executed by the user. For example, the interaction management system 105 can detect when the user performs given soccer drills that were included in the interactions. The interaction management system 105 determine detect the interactions by at least one of identifying when at least a portion of the user enters and/or otherwise engages with the bounding box of the soccer ball (e.g., the object), detecting that a position of the soccer ball and/or a position of the bounding box enclosing the soccer ball has changed, determining that a placement of the user has changed (e.g., the users kicking leg moved from a retracted position to an extended position), and/or among various possible combinations and/or alternatives.

The interaction management system 105 can also determine the one or more aspects of the plurality of interactions by associating the given interactions with one or more positions of the object. For example, the interaction management system 105 can determine, for a given interaction, a portion of the soccer ball that the user interacted with (e.g., what portion of the soccer ball did the user kick). The associations between the interactions and the positions of the object (e.g., the soccer ball) can be used by the interaction management system 105 to evaluate, rank, score, and/or otherwise classify the interactions.

The interaction management system 105 can generate the performance metric for the plurality of interactions by determining points of contact between the user and object. For example, the interaction management system 105 can determine a given portion of the user that contacts a given portion of the soccer ball (e.g., a lateral portion of the users leg made contact with a center portion of the soccer ball). The interaction management system 105 can determine the points of contacts based on the bounding boxes generated by the interaction management system 105. For example, the interaction management system 105 can determine which portion of the bounding box enclosing the soccer ball that a portion of the user entered.

The interaction management system 105 can also generate the performance metric for the plurality of interactions by identifying amounts of interactions. For example, the interaction management system 105 can determine a first number of interactions that exceed a predetermined threshold. The interaction management system 105 can also determine a second number of interactions below the predetermined threshold. For example, the predetermined threshold can be that the user kicks and/or makes contact with a center portion of the soccer ball. The interaction management system 105 can determine the number of times that the center portion of the soccer ball was hit (e.g., the first number of interactions) and the interaction management system 105 can also determine the number of times that a different portion of the soccer ball was hit (e.g., the second number of interactions).

In interaction management system 105 can also generate the performance metric for the plurality of interactions by one or more scores for the plurality of interactions. For example, the first number of interactions can be larger than, smaller than, and/or equal to the second number of interactions. The first number of interactions being larger than the second number of interactions may result in the interactions having a first score. Similarly, the first number of interactions being smaller than the second number of interactions may result in the interactions having a second score. A value and/or a level of the score may indicate the performance metric of the user interactions. For example, the performance metric may be and/or include a number scale (e.g., 0-10, 0-100, percentile score, etc.) and the level of the score may by a given value within the number scale.

Figure 2:
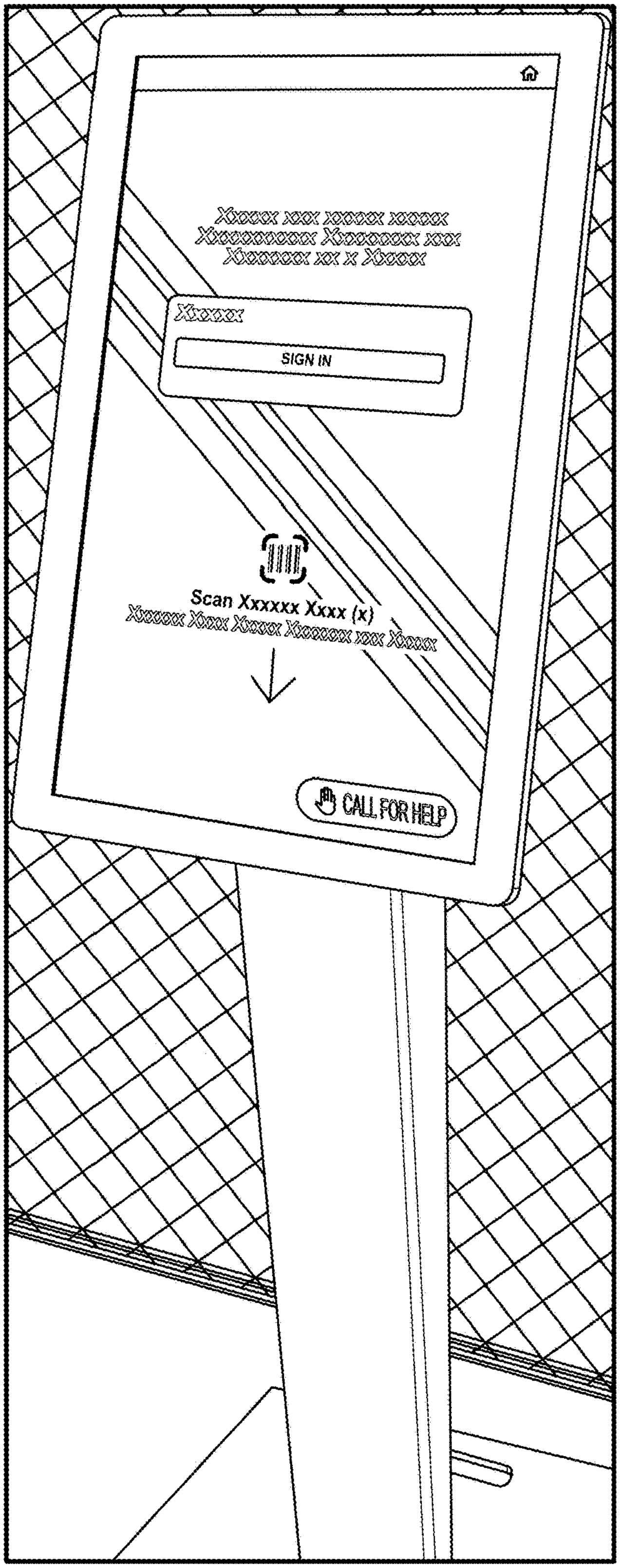
FIG. 2 is a perspective view of a terminal for use in a flexible sports bay, according to some embodiments.

FIG. 2 is a perspective view of a terminal 205, according to some embodiments. The terminal 205 can be included with and/or used in conjunction with the flexible sports bay described herein. The terminal 205 can be and/or include the terminal described herein. The terminal 205 can house, incorporate, and/or otherwise include the interaction management system 105. The terminal 205 can include a display and the display can generate, present, display, and/or otherwise provide at least one the user interfaces described herein. The terminal 205 can interact with, interface with, and/or otherwise communicate with the sensors 135 and/or the user devices 140. For example, the terminal 205 can be directly coupled with the sensors 135 and the terminal 205 can communicate, via wired communication, with the sensors 135. The terminal 205 can also communication with at least one of the sensors 135 and/or the user devices 140 via wireless communication (e.g., Bluetooth, CAN, wi-fi, etc.). In some embodiments, the terminal 205 can provide control signals to modify, change, adjust, and/or otherwise alter operations of the sensors 135 to obtain information associated with user interactions with the sports bay. To continue this example, the sports bay can include a plurality of modes (e.g., bat selection mode, baseball coaching mode, remote lesson mode, soccer cleat selection mode, and/or among various possible modes) and the terminal 205 can provide signals to the sensors 135 to configure the sensors 135 with respect to the modes.

Figure 3:
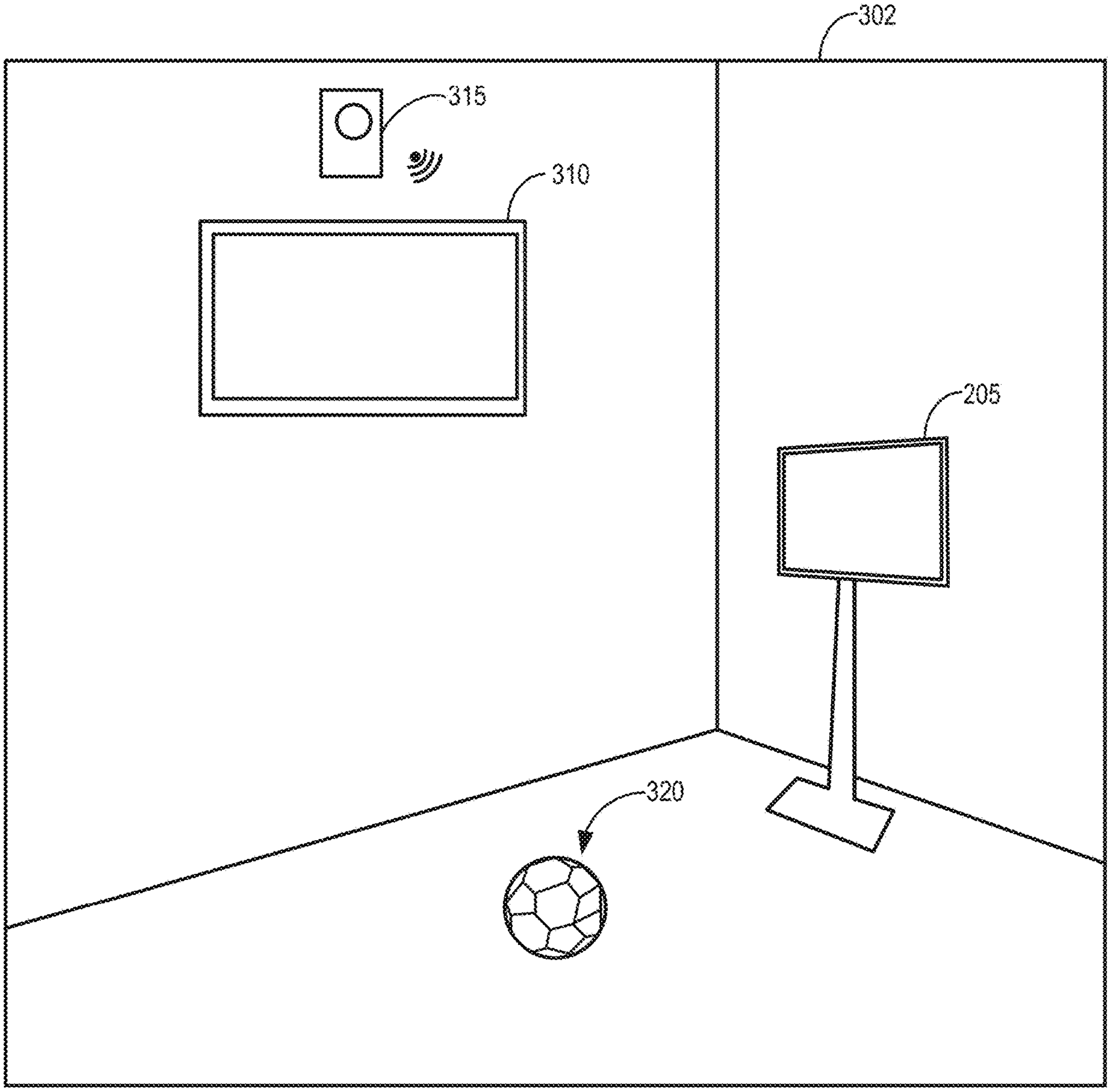
FIG. 3 is a perspective view of a flexible sports bay including the terminal illustrated in FIG. 2, according to some embodiments.

FIG. 3 is a perspective view of a flexible sports bay 302, according to some embodiments. The flexible sports bay 302 can be and/or include the sports bay and/or the flexible sports bay described herein. The flexible sports bay 302 can be and/or include at least one of a barrier, an enclosure, a barricade, netting, fencing, and/or other possible structures. In some embodiments, the flexible sports bay 302 can be included in, located in, and/or otherwise placed in a store. For example, the flexible sports bay 302 can be located in a sporting goods store. The flexible sports bay 302 can include the terminal 205. For example, the terminal 205 can be housed within, located proximate to, and/or otherwise positioned within the flexible sports bay 302. The flexible sports bay 302 can include at least one device 310, at least one camera 315, and at least one object 320. The device 310 can be and/or include at least one of device described herein. For example, the device 310 can and/or include the user devices 140. The cameras 315 can be and/or include the sensors 135. The objects 320 can be and/or include the various objects described herein. For example, the objects 320 can be a baseball, a baseball bat, a softball, a softball bat, a hitting tee, a soccer ball, a soccer net, a target, and/or among various possible combinations. FIG. 3 depicts an example of the objects 320 including a soccer ball positioned on a ground surface within the flexible sports bay 302.

The cameras 315 can obtain information associated with interaction corresponding to, pertaining to, and/or otherwise associated with a plurality of modes of the flexible sports bay 302. For example, the cameras 315 can generate, capture, and/or otherwise obtain images, videos, performance metrics, and/or among other possible information described herein. The cameras 315 can be designed, configured, and/or otherwise modified to adjust the operations that are performed by the cameras 315. For example, the cameras 315 may perform a first set of operations when the user interactions pertain to bat selection (e.g. a mode of the flexible sports bay 302) and the cameras 315 may perform a second set of operations when the user interactions pertain to soccer cleat selection (e.g., a mode of the flexible sports bay 302). The terminal 205 and/or the interaction management system 105 can communicate with the cameras 315 to adjust the operations of the cameras.

The terminal 205 can receive a selection of at least one mode of the flexible sports bay 302. For example, the terminal 205 can receive, via the display of the terminal 205, a selection of a bat selection mode (e.g., a mode of the flexible sports bay 302). The terminal 205 can receive the selection responsive to an operator and/or user of the terminal 205 interacting with, interfacing with, and/or otherwise engaging with the terminal 205. For example, the user of the terminal 205 can select an icon display on a user interface and the terminal 205 can detect the interaction (e.g., detect the selection of the icon).

The terminal 205 can determine parameters pertaining to the cameras 315. The parameters can pertain to the mode that was selected by the user. For example, the parameters can pertain to a soccer cleat selection mode (e.g., a mode of the flexible sports bay 302). The cameras 315 can include a plurality of parameters and the parameters can be associated with one or more modes. For example, the cameras 315 can include at least one of configuration settings, operating setpoints, operating criteria, operating specifications, and/or among other possible arrangements that correspond to at least one mode of the various modes of the flexible sports bay 302.

The various modes of the flexible sports bay 302 may include and/or implement given interactions and the cameras 315 can perform and/or implement given actions to capture the interactions pertaining to the various modes. For example, during the soccer cleat selection mode (e.g., a mode), the cameras 315 may capture information pertaining to the soccer ball (e.g., the object 320) as well as images of the user striking and/or hitting the soccer ball. As another example, during soccer cleat selection (e.g., a mode) the cameras 315 may capture images of the user interacting with the soccer ball. The operations performed by the cameras 315 may vary and/or differ amongst various modes and the terminal 205 can control and/or configure the cameras 315 to perform the operations pertaining to the modes.

The terminal 205 can determine the parameters pertaining to the camera responsive to receiving the selection of the mode of the flexible sports bay 302. For example, the terminal 205 can determine the parameters of the cameras 315 that are associated with bat selection (e.g., a mode of the flexible sports bay 302) based on the one or more aspects included in the user interactions (e.g., the user hitting and/or interacting with the baseball). The terminal 205 can determine the parameters of the cameras 315 based on information that may be used to analyze, evaluate, and/or otherwise grade the user interactions. For example, the terminal 205 can determine that the bat selection mode includes collecting information pertaining to the launch angle of the baseball and the terminal 205 can determine the parameters of the cameras 315 to have the cameras 315 collect information pertaining to the launch angle of the baseball.

The terminal 205 can control the cameras 315 to execute operations to obtain information associated with interactions pertaining to the mode of the flexible sports bay 302. For example, the terminal 205 can provide, to the cameras 315, control signals and/or operating settings that result in the cameras 315 performing given operations to obtain information associated with bat selection. To continue this example, the cameras 315 may perform a given number of steps and/or a given order of steps based on the parameters determined by the terminal 205.

The terminal 205 can receive one or more selections. For example, the terminal 205 can receive a first selection, from a first user, pertaining to baseball instructions and the terminal 205 can receive, a second selection, from a second user, pertaining to soccer cleat selection. The terminal 205 can determine the parameters for the various selected modes and the terminal 205 can control the cameras 315 using the parameters. The parameters for the various selected modes can be different. For example, a first mode can include a first set of parameters and a second mode can include a second set of parameters. To continue this example, at least one parameter in the first set of parameters can be different from at least one parameter in the second set of parameters.

The terminal 205 can receive, an indication of a selection of a mode of the flexible sports bay 302. For example, the terminal 205 can receive, via a user interface display by the terminal 205, a selection of an icon pertaining to soccer cleat selection (e.g., the mode of the flexible sports bay 302). The terminal 205 can identify, based on the selected mode, operations that the camera 315 can perform to capture one or more interactions associated with the selected mode. For example, the terminal 205 can identify information that the cameras 315 can capture (e.g., the operations) while a user is performing interactions associated with soccer clear selection (e.g., the selected mode).

The terminal 205 can determine current operating parameters of the camera 315. For example, the terminal 205 can determine that the camera 315 is currently configured to perform operations associated with bat selection. The terminal 205 can determine the current operating parameters of the camera 315 by at least one of tracking control signals that the terminal 205 has sent to the cameras 315 (e.g., signals that controlled operations of the cameras 315 and/or altering operation parameters of the cameras 315), tracking operations that have been performed by the cameras 315 (e.g., what operations has the camera 315 most recently performed), storing the operating parameters in the external database 145 and retrieving periodically, and/or among various possible combinations and/or alternatives.

The terminal 205 can determine one or more changes to the current operating parameters for use in capturing the plurality of interactions. For example, the terminal 205 can compare operating parameters of the cameras 315 associated with soccer cleat selection (e.g., configuration settings for the camera 315 for use in soccer cleat selection) with the current operating parameters. The terminal 205 can determine the one or more changes based on differences between the operating parameters associated with soccer cleat selection and the current operating parameters. For example, the current operating parameters of the cameras 315 may cause the cameras 315 to capture images of interactions with the flexible sports bay 302 and the operating parameters associated with soccer cleat selection may include capturing images and tracking object placement. In this example, the one or more changes to the operating parameters of the cameras 315 may include determining that the operating parameters of the cameras 315 be updated to include tracking object placement.

The terminal 205 can update the current operating parameters to reflect the one or more changes. For example, the terminal 205 can update the operating parameters to remove operating parameters that may cause the cameras 315 to perform operations that are not associated with a given selected mode (e.g., soccer cleat selection) and/or update the operating parameters to include operating parameters that may cause the cameras 315 to perform operations that are associated with the given selected mode. As another example, the terminal 205 can update the operating parameters to reflect the one or more changes by adjusting and/or modifying setpoints pertaining to the cameras 315. For example, the current operating parameters of the cameras 315 may include the camera capturing images with a given refresh rate and the update to the current operating parameters may include changing the refresh rate.

The terminal 205 can receive information pertaining to the interactions. For example, the terminal 205 can receive the information responsive to the cameras 315 capturing the interactions (e.g., responsive to the user performing and/or executing the interactions). The terminal 205 can receive the information periodically as the cameras 315 capture the information and/or the terminal 205 can receive the information upon completion of the interactions. The information received by the terminal 205 can be and/or include at least one of images, videos, photos, timestamps, performance information, and/or various possible combinations and/or alternatives.

The terminal 205 can identify one or more images associated with the interactions. For example, the terminal 205 can identify the images from the information received from the cameras 315. The terminal 205 can identify the images by at least one of detecting, discerning, recognizing, and/or otherwise determining that the information captured by the cameras 315 includes images. The images can include the user performing and/or executing the interactions. For example, the images can include the user kicking the soccer ball.

The terminal 205 can execute a ML model to apply bounding boxes to objects included in the images. For example, the terminal 205 can apply bounding boxes to the user performing the interactions and the soccer ball 320. The terminal 205 and/or the ML model can perform various processes and/or techniques to apply bounding boxes.

The terminal 205 can determine one or more aspects of the interactions. For example, the terminal 205 can determine when the user was kicking the soccer ball (e.g., an aspect), when the user was touching the soccer ball (e.g., an aspect), when the user was lining up to kick the soccer ball (e.g., an aspect), and/or among various possible combinations and/or alternatives. The terminal 205 can determine the one or more aspects of the interactions by using and/or executing the ML model responsive to applying the bounding boxes.

In some embodiments, the terminal 205 and/or processing circuit thereof may implement or otherwise utilize computer vision to apply bounding boxes to objects. For example, the terminal 205 may include a single-stage object detector. As another example, the terminal 205 may interface with or otherwise communicate with a single-stage object detector. In some embodiments, the terminal 205 may implement or utilize neural networks to apply the bounding boxes. For example, the terminal 205 may provide image data (e.g., inputs) to a convolutional neural network to cause the convolutional neural network to apply bounding boxes to the image data. In some embodiments, the terminal 205 may interface with the cameras 315 to receive image data from the cameras 315. The terminal 205 may implement an object detector or computer vision techniques to apply bounding boxes to the image data.

The interaction management system 105 can receive an indication of a selection of a plurality of pieces of soccer equipment. For example, the interaction management system 105 can receive the indication from the terminal 205 responsive to an operator of the terminal 205 providing, via interactions with the user interface, the selection of the plurality of pieces of soccer equipment. To continue this example, the user interface can include a list of soccer equipment (e.g., soccer cleats, soccer balls, soccer nets, etc.) and the user of the terminal 205 can select given pieces of soccer equipment. In some embodiments, the terminal 205 can receive the selection of the plurality of pieces of soccer equipment responsive to the user interacting with and/or selecting icons included in the user interface. The indication can include information identifying the plurality of pieces of soccer equipment. For example, the plurality of pieces of soccer equipment can be and/or include soccer cleats and the indication can include model numbers for the soccer cleats.

The interaction management system 105 can provide a prompt to initiate performance of a plurality of soccer moves by a user. For example, the interaction management system 105 can provide a prompt to the terminal 205 and the terminal 205 can display, via a user interface, the prompt. The plurality of soccer moves can be and/or include at least one of soccer drills, kicking exercises, tap exercises, dribbling course, and/or among other drills. The user can utilize the plurality of pieces of soccer equipment while performing the plurality of soccer moves. For example, the plurality of soccer moves can include kicking a soccer ball (e.g., a piece of soccer equipment) while wearing soccer cleats (e.g., a piece of soccer equipment). The prompt can include information pertaining to the plurality of soccer moves. For example, the plurality of soccer moves can include kicking exercises and the prompt can include a brief video including a demonstration of the kicking exercises.

The interaction management system 105 can evaluate one or more characteristics of the user associated with performance of the plurality of soccer moves by the user. For example, the interaction management system 105 can track, rank, score, and/or otherwise grade the user performance of the plurality of soccer moves. For example, the plurality of soccer moves can include tapping exercise (e.g., tapping a soccer ball one or more times) and the interaction management system 105 can rank the performance of the plurality of soccer moves based on the number of times the user tapped the soccer ball. The interaction management system 105 can evaluate the one or more characteristics while the user performs the plurality of soccer moves based on information obtained during the performance. For example, the cameras 315 can capture images of the user performing the plurality of soccer moves and the images can be provided to the interaction management system 105 for evaluation.

The interaction management system 105 can generate a recommendation for one or more pieces of soccer equipment. For example, the interaction management system 105 can generate recommendations for given soccer cleats. The recommendations can be based on the user's performance with respect to the plurality of soccer moves. For example, the recommendations can include soccer cleats that wore by the user and where the user, when wearing the soccer cleats, excelled in the plurality of soccer moves. The recommendations can also include various other types of soccer equipment. For example, the recommendations can include soccer balls, cones, soccer nets, training accessories (e.g., bands, weights, etc.), and/or other possible sporting equipment. The interaction management system 105 can generate, responsive to evaluation of the one or more characteristics, a recommendation. For example, the interaction management system 105 can evaluate the user performing the soccer moves and the interaction management system can generate the recommendations responsive to evaluating the performance.

User Interfaces

The various systems, devices, and/or components described herein can generate, create, provide, display, exhibit, and/or otherwise present at least one user interface. For example, the terminal 205 can generate a user interface and the user interface can be presented via a display device (e.g., a screen, monitor, and/or otherwise possible display devices) of the terminal 205. An operator and/or user of the terminal 205 can interface with, interact with, and/or otherwise engage with various portions of the user interfaces to provide information to and/or receive information from the terminal 205 and/or the interaction management system 105. For example, the user can select a mode of the flexible sports bay 302 by engaging (e.g., touching and/or selecting) an icon displayed and/or included in a user interface.

The various user interfaces described herein can be generated and display by the various systems, devices, and/or components described herein. The various user interfaces can be provided to the user devices 140 and the user devices 104 can display, responsive to receiving the user interfaces, the user interfaces. The various user interfaces can be presented as at least one of pop-up windows, image overlays, scrolling pages and/or scrolling windows, and/or among various possible alternatives and/or combinations. For example, the terminal 205 may display a first user interface including a plurality of icons and a selection of a first icon may cause a pop-up window to be display on top of and/or in conjunction with the first user interface.

Figure 4:
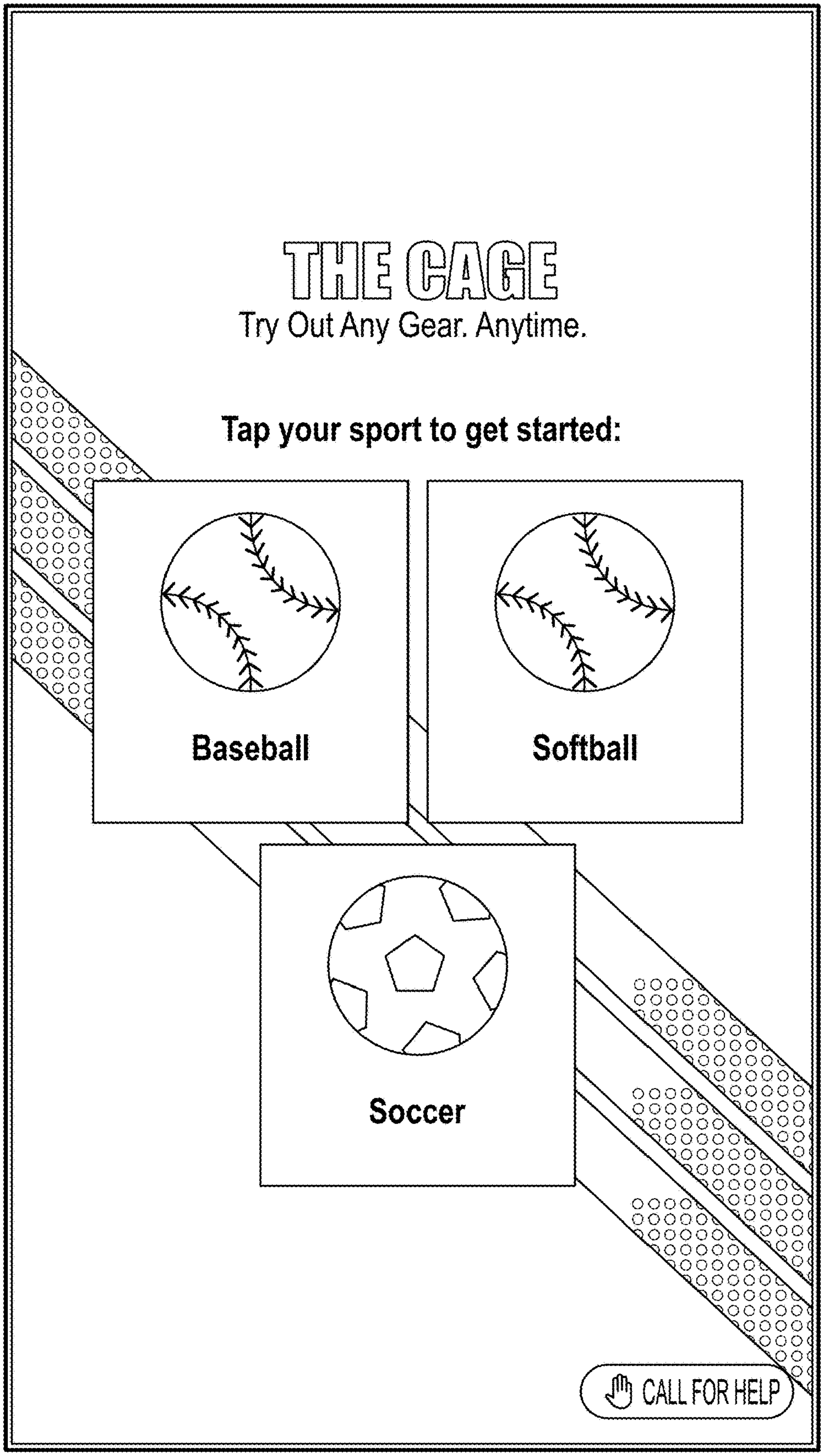
FIG. 4 is a user interface for use in providing user selections pertaining to one or more interactions within the flexible sports bay illustrated in FIG. 3, according to some embodiments.

FIG. 4 depicts an example user interface, according to some embodiments. The user interface can include at least one icon and/or visual display. FIG. 4 shows an example of the user interface including an icon associated with baseball, an icon associated with softball, and an icon associated with soccer. The user interface can be displayed by the terminal 205. An operator and/or a user of the terminal 205 can interface with, interact with, and/or otherwise engage with one of the icons to provide an indication to the terminal 205. For example, the user can select the soccer icon to provide an indication to the terminal 205 that the user has selected a mode pertaining to the flexible sports bay 302.

Figure 5:
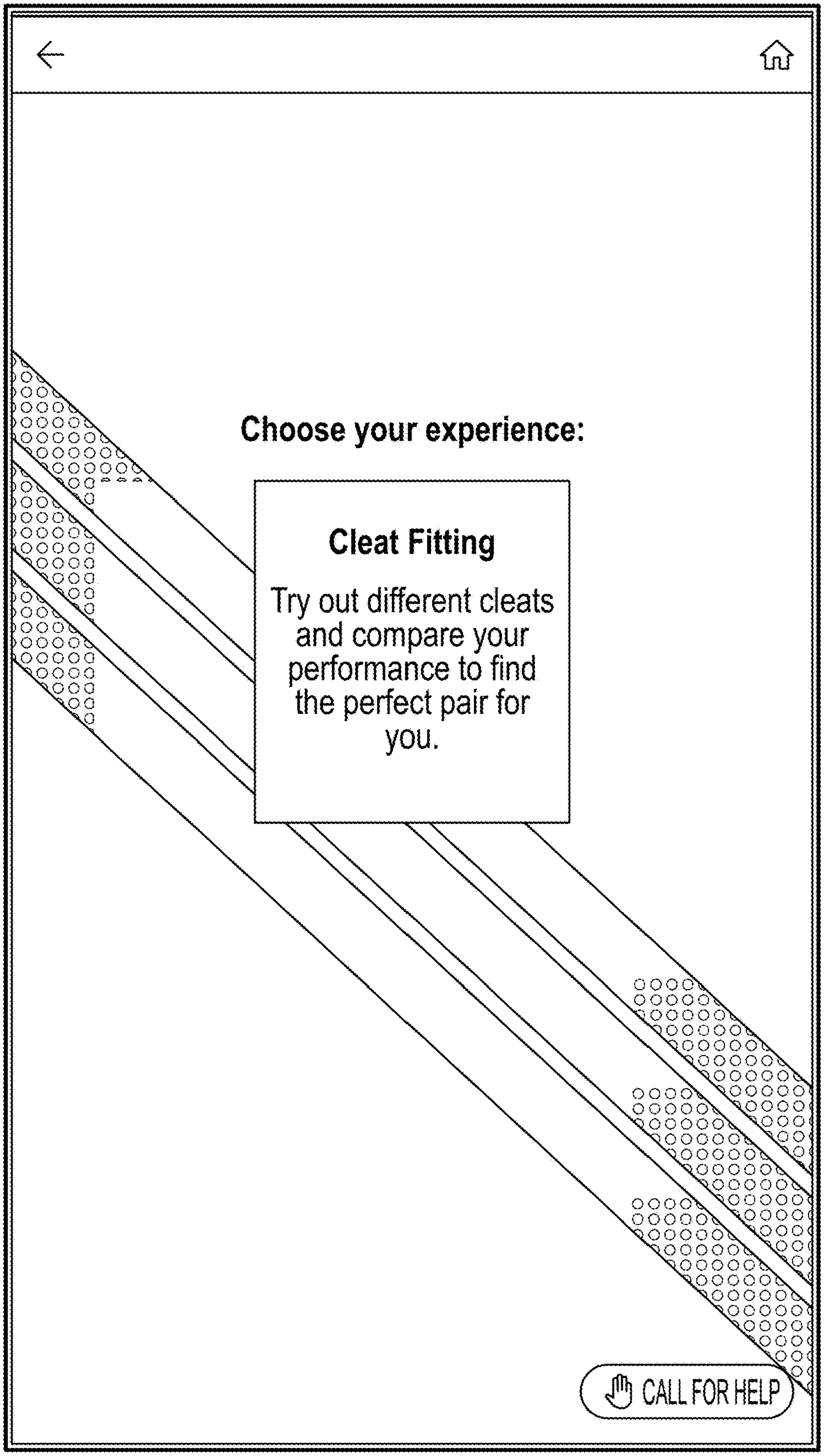
FIG. 5 is a user interface for use in providing a selection of a mode pertaining to the flexible sports bay illustrated in FIG. 3, according to some embodiments.

FIG. 5 depicts an example user interface, according to some embodiments. The user interface can include at least one icon and/or visual display. The user interface shown in FIG. 5 can be presented, generated, and/or displayed responsive to the user selecting at least one of the icons shown in FIG. 4. For example, the user interface can be displayed as a pop-up window responsive to the user selecting the soccer icon as shown in FIG. 4. The user interface shown in FIG. 5 can include at least one icon that represents at least one mode of the flexible sports bay 302. FIG. 5 depicts an example of the user interface including an icon for the cleat fitting and/or the cleat selection mode described herein. The operator and/or the user of the terminal 205 can select at least one of the icons including the user interface shown in FIG. 5 to provide an indication of a selected mode of the flexible sports bay 302. The selection of the icon may cause the terminal 205 and/or the interaction management system 105 to configure and/or control the cameras 315 as described herein.

Figure 6:
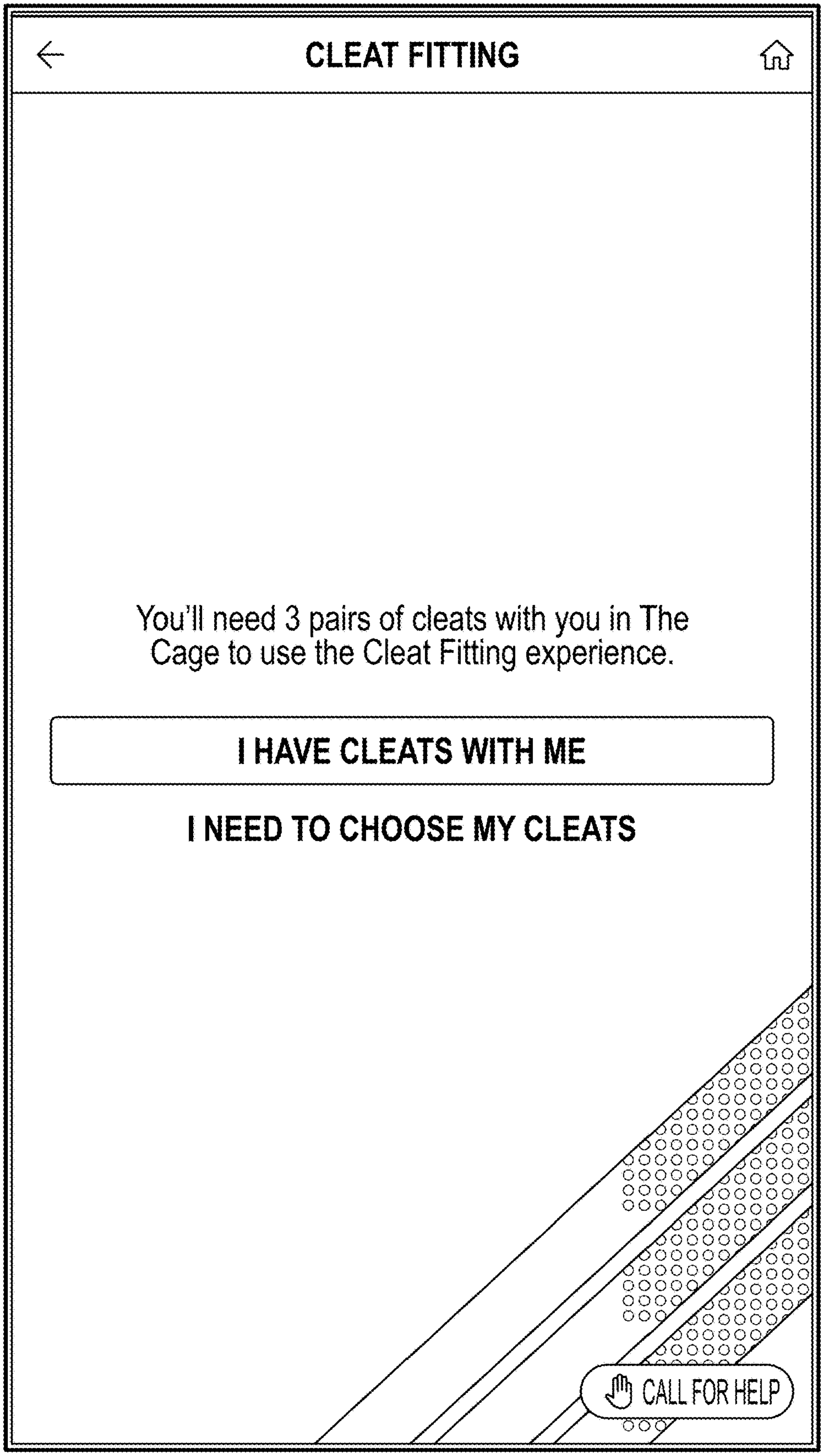
FIG. 6 is a user interface for use in providing information associated with a user of the flexible sports bay illustrated in FIG. 3, according to some embodiments.

FIG. 6 depicts an example user interface, according to some embodiments. The user interface can include at least one icon and/or visual display. The user interface shown in FIG. 6 can be presented, generated, and/or displayed responsive to the user selecting at least one of the icons shown in FIG. 5. For example, the selection of the cleat fitting icon, as shown in FIG. 5, may cause the terminal 205 to generate and/or display the user interface shown in FIG. 6. FIG. 6 depicts an example of the user interface including icons that can be selected by the user to indicate whether the user of the terminal 205 has already selected cleats for use in the user interactions pertaining to the selected mode of the flexible sports bay 302.

Figure 7:
FIG. 7 is a user interface for use in providing information associated with one or more pieces of sports equipment for use in user interactions with the flexible sports bay illustrated in FIG. 3, according to some embodiments.

FIG. 7 depicts an example user interface, according to some embodiments. The user interface shown in FIG. 7 can be generated and/or displayed responsive to the user providing information to the terminal 205 pertaining to at least one mode of the flexible sports bay 302. For example, the user interface shown in FIG. 7 may be generated responsive to the user selecting the cleat fitting mode of the flexible sports bay 302. The user interface shown in FIG. 7 can include at least one of a prompt, a text box, a visual cue, and/or a message providing information pertaining to the mode of the flexible sports bay 302 and/or the corresponding user interactions. FIG. 7 depicts an example of the user interface including a message that a user can scan and/or manually enter information pertaining to soccer cleats (e.g., pieces of sports equipment).

Figure 8:
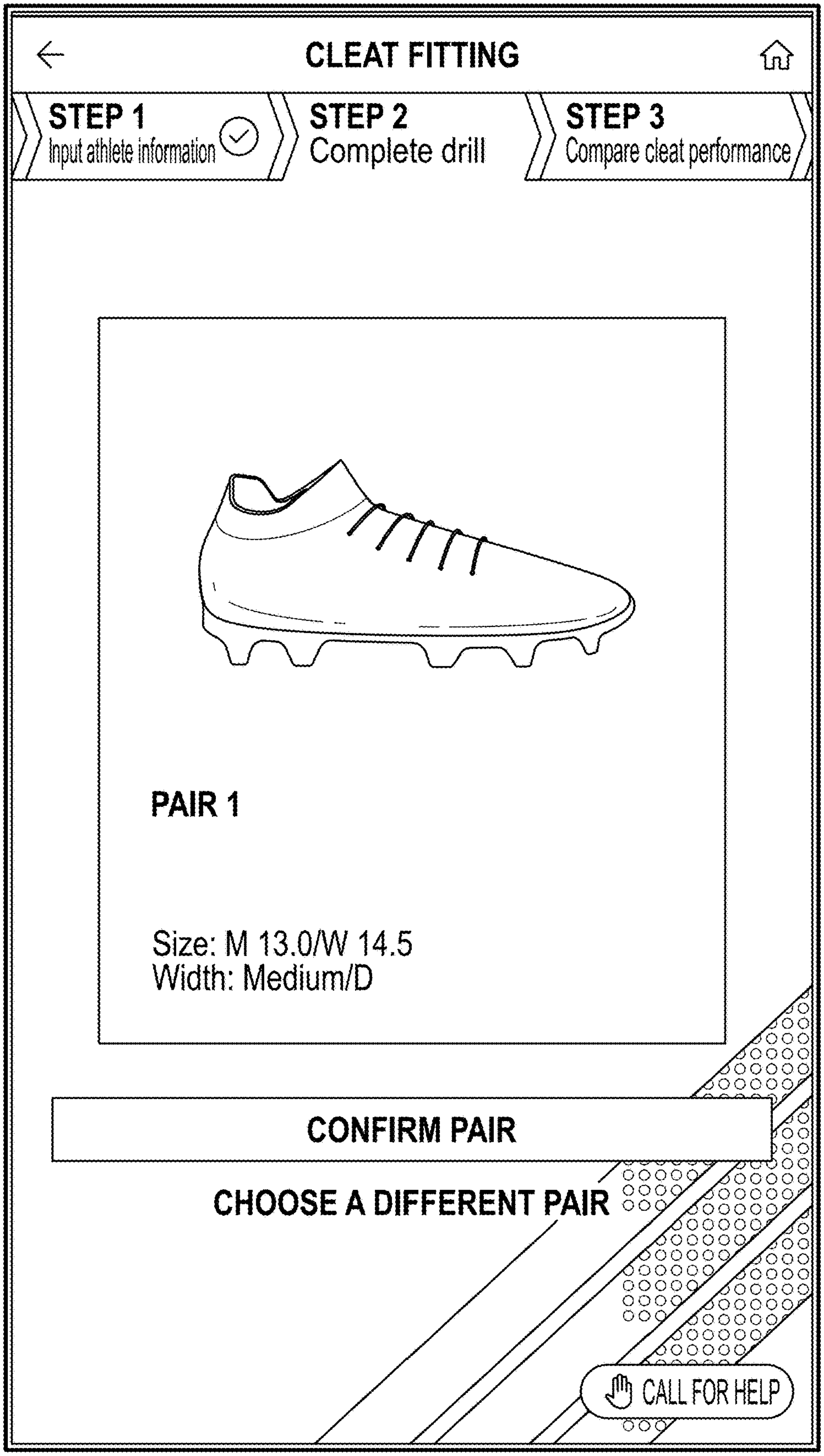
FIG. 8 is a user interface for use in providing information associated with one or more pieces of sports equipment for use in user interactions with the flexible sports bay illustrated in FIG. 3, according to some embodiments.

FIG. 8 depicts an example user interface, according to some embodiments. The user interface can be generated responsive to the user scanning and/or providing information pertaining to at least one pair of soccer cleats. The user interface can include a graphical representation (e.g., a picture) of the soccer cleats. The graphical representation can include various information pertaining to the soccer cleats. The user can select at least one icon included in the user interface. For example, the user can select an icon to confirm the soccer cleats and/or the user can select an icon to pick a different pair of soccer cleats.

Figure 9:
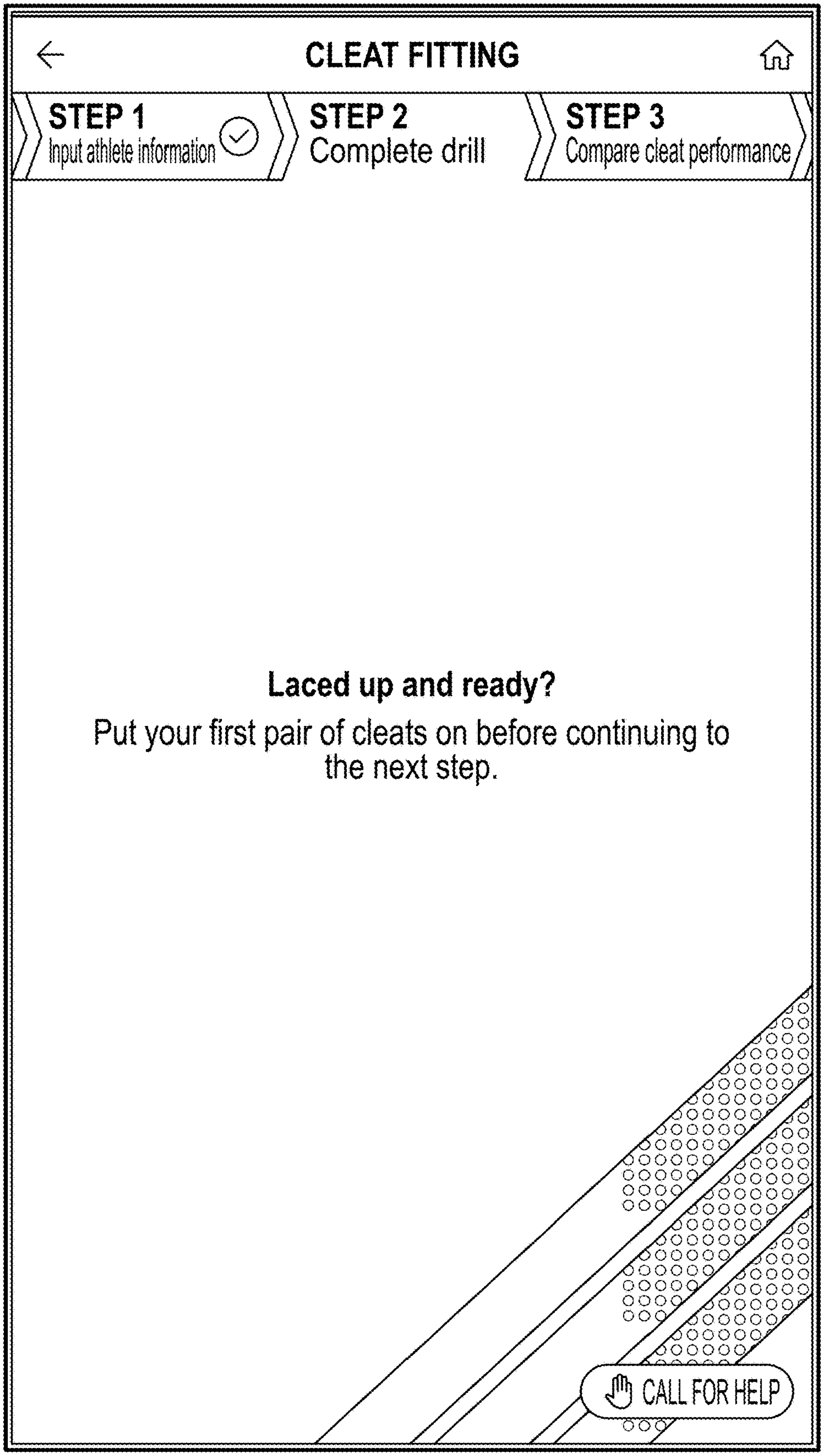
FIG. 9 is a user interface for initiating user interactions with the flexible sports bay illustrated in FIG. 3, according to some embodiments.

FIG. 9 depicts an example user interface, according to some embodiments. The user interface can be generated responsive to the user indicating that they would like to initiate the user interactions pertaining to a selected mode of the flexible sports bay 302. For example, the user may select an icon displayed in at least one of the user interfaces described herein to provide an indication that they are ready to start their user interactions. The user interface shown in FIG. 9 can include a message that the user can put on the selected soccer cleats and/or otherwise get ready to execute one or more user interactions.

Figure 10:
FIG. 10 is a user interface for use in providing information associated with one or more pieces of sports equipment for use in user interactions with the flexible sports bay illustrated in FIG. 3, according to some embodiments.

FIG. 10 depicts an example user interface, according to some embodiments. The user interface can be generated responsive to the terminal 205 receiving an indication of a selection of a mode of the flexible sports bay 302. The user interface can include at least one message and at least one icon. For example, the user interface can include a message indicating at least one step that can be taken by the user to initiate and/or or get ready to partake in the user interactions.

Figure 11:
FIG. 11 is a user interface for use in providing information associated with one or more pieces of sports equipment for use in user interactions with the flexible sports bay illustrated in FIG. 3, according to some embodiments.

FIG. 11 depicts an example user interface, according to some embodiments. The user interface can be generated responsive to the terminal 205 receiving an indication that the user is ready to proceed with getting ready to execute the interactions pertaining to a selected mode of the flexible sports bay 302. FIG. 11 depicts an example of the user interface including one or more icons that can be selected by the user of the terminal 205 to provide indications of the user's experience level.

Figure 12:
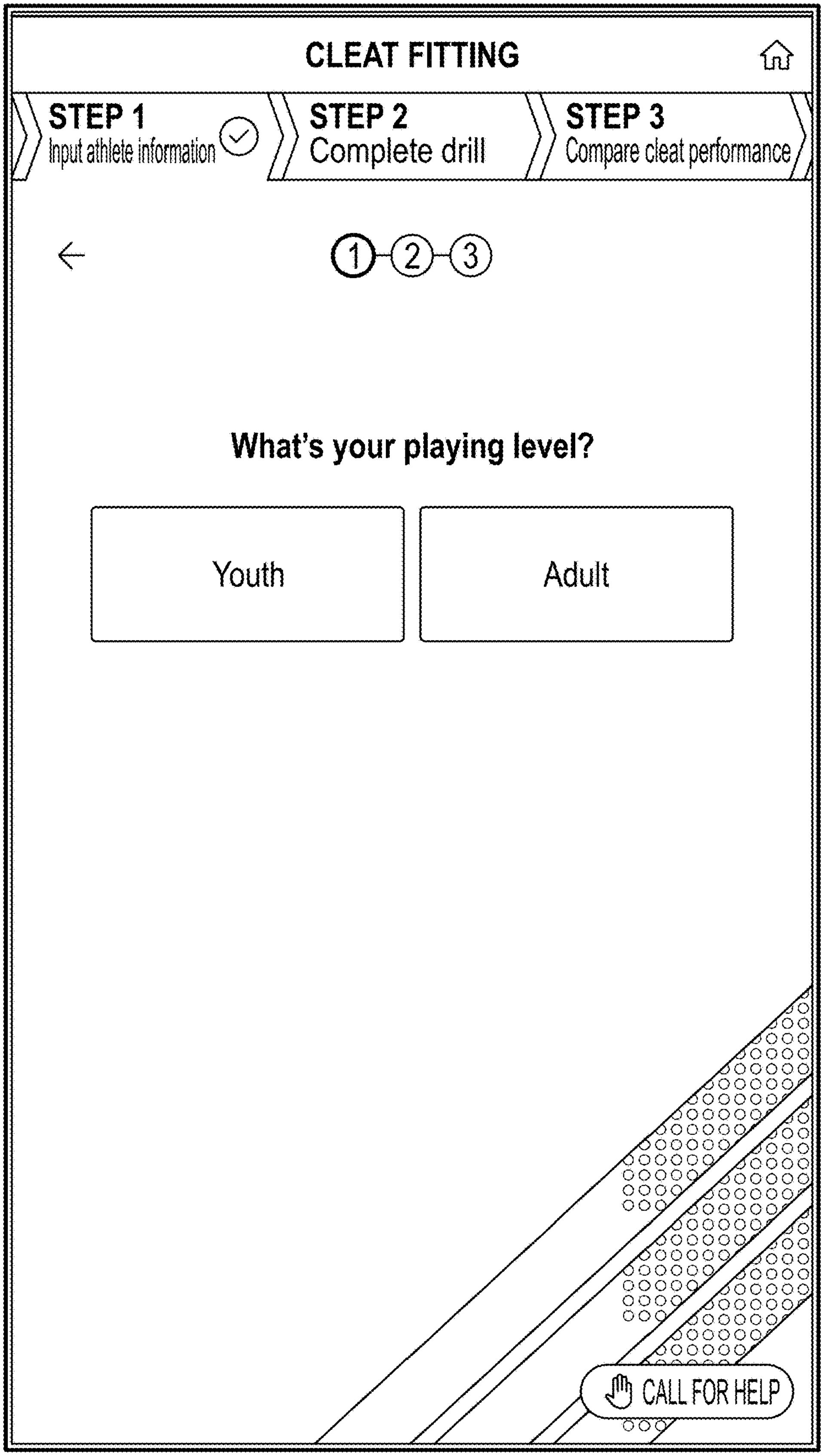
FIG. 12 is a user interface for use in providing information associated with one or more pieces of sports equipment for use in user interactions with the flexible sports bay illustrated in FIG. 3, according to some embodiments.

FIG. 12 depicts an example user interface, according to some embodiments. The user interface can be generated responsive to the user selecting at least one of the icons described herein. For example, the user interface shown in FIG. 12 can be generated responsive to the user selecting at least one icon shown in FIG. 11. FIG. 12 depicts an example of the user interface including one or more icons pertaining to a playing level of the user. For example, the user interface can include at least one icon for one or more playing levels pertaining to a sport that is associated with the selected mode of the flexible sports bay 302.

Figure 13:
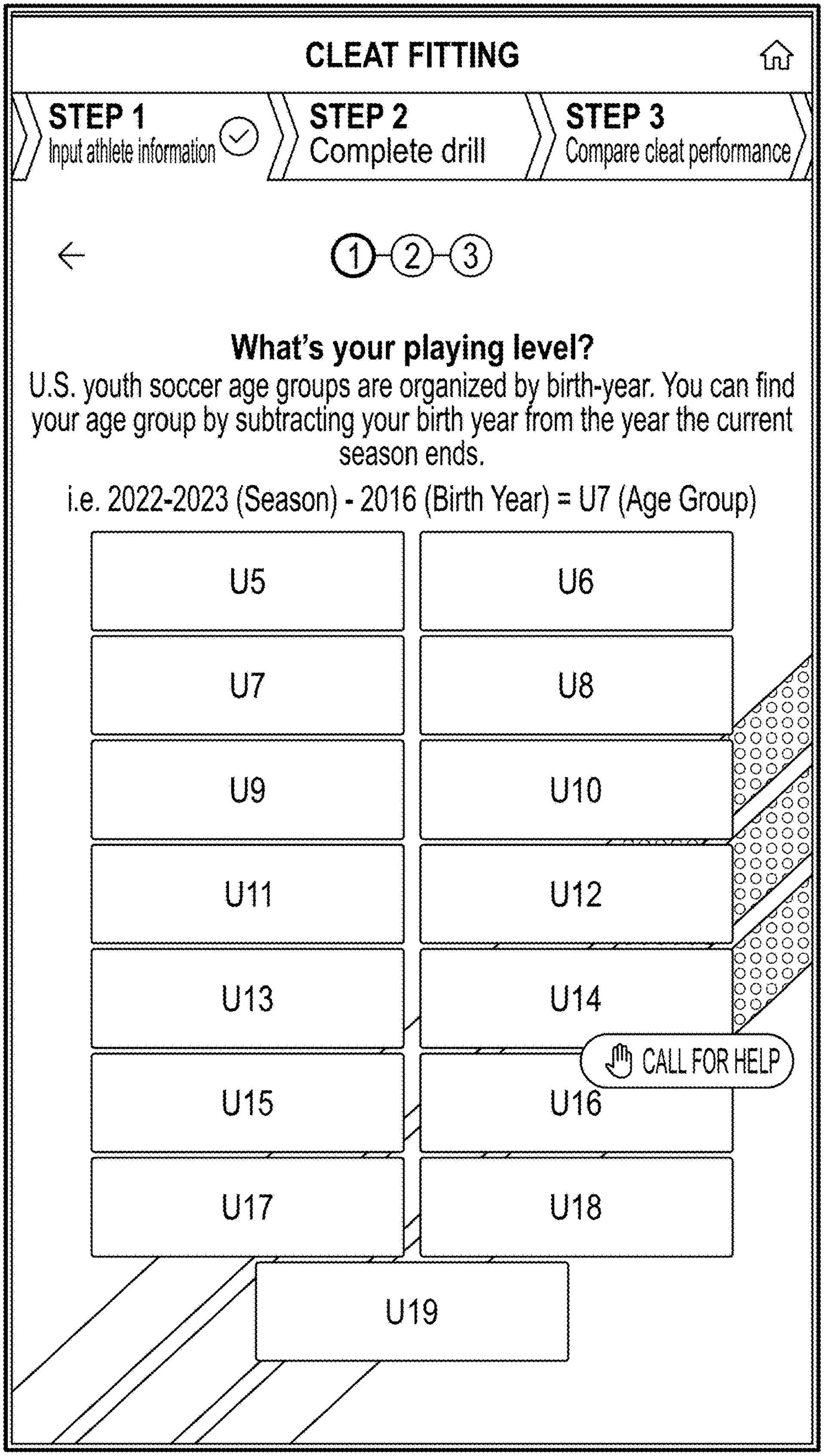
FIG. 13 is a user interface for use in providing information associated with one or more pieces of sports equipment for use in user interactions with the flexible sports bay illustrated in FIG. 3, according to some embodiments.

FIG. 13 depicts an example user interface, according to some embodiments. The user interface can be generated responsive to the user selecting at least one of the icons described herein. For example, the user interface can be generated responsive to the user selecting at least one icon shown in FIG. 12. The user interface can include one or more icons and the icons can be associated with at least one age group and/or division. FIG. 13 depicts an example of the icons being associated with various age groups.

Figure 14:
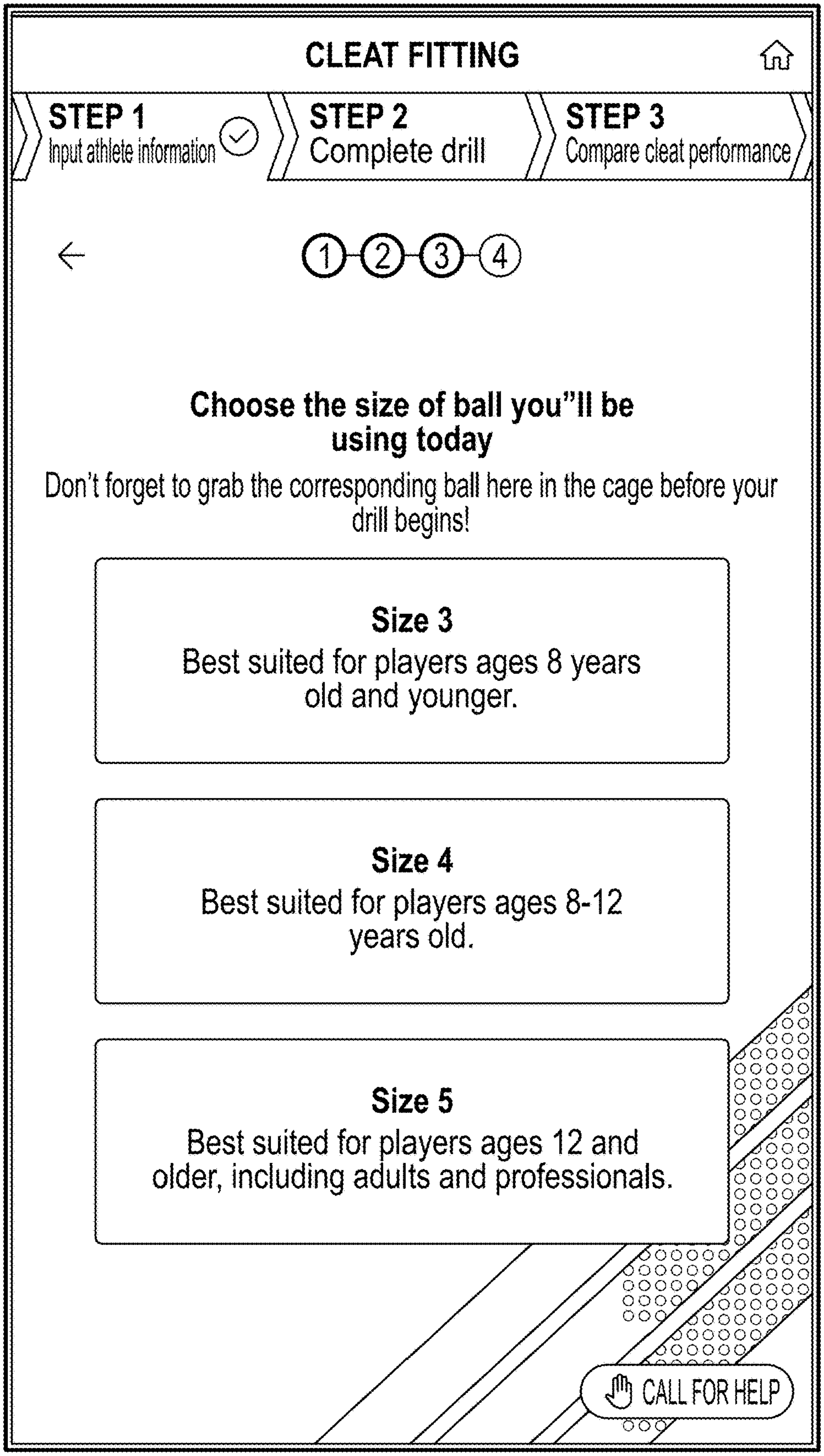
FIG. 14 is a user interface for use in providing information associated with one or more pieces of sports equipment for use in user interactions with the flexible sports bay illustrated in FIG. 3, according to some embodiments.

FIG. 14 depicts an example user interface, according to some embodiments. The user interface can be generated responsive to the user selecting at least one of the icons described herein. For example, the user interface can be generated responsive to the user selecting at least one icon shown in FIG. 13. The user interface can include at least one icon and the icons can be selected to provide information associated with the object that the user may interact with to execute the interactions. FIG. 13 depicts an example of the user interface including icons that can be selected by the user to indicate a soccer ball size pertaining to the soccer ball that may be used during the interactions.

Figure 15:
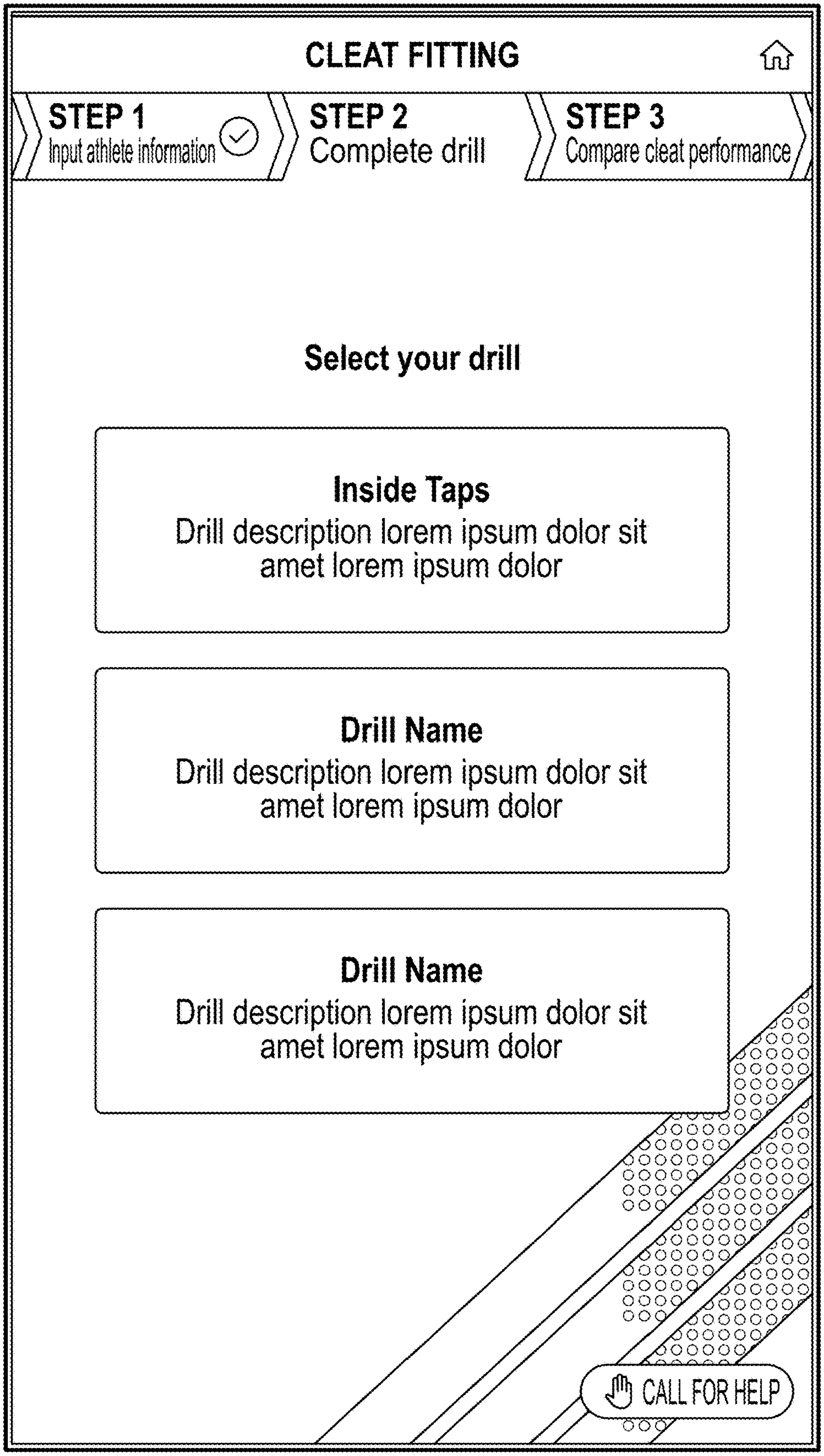
FIG. 15 is a user interface for use in selecting user interactions pertaining to one or more modes of the flexible sports bay illustrated in FIG. 3, according to some embodiments.

FIG. 15 depicts an example user interface, according to some embodiments. The user interface can be generated responsive to the user selecting at least one of the icons described herein. For example, the user interface can be generated responsive to the user selecting at least one icon shown in FIG. 14. The user interface can include at least one icon and the icons can be selected to provide an indication of a given interaction and/or drill pertaining to the selected mode of the flexible sports bay. FIG. 15 depicts an example of the user interface including icons that can be selected to indicate a given drill.

Figure 16:
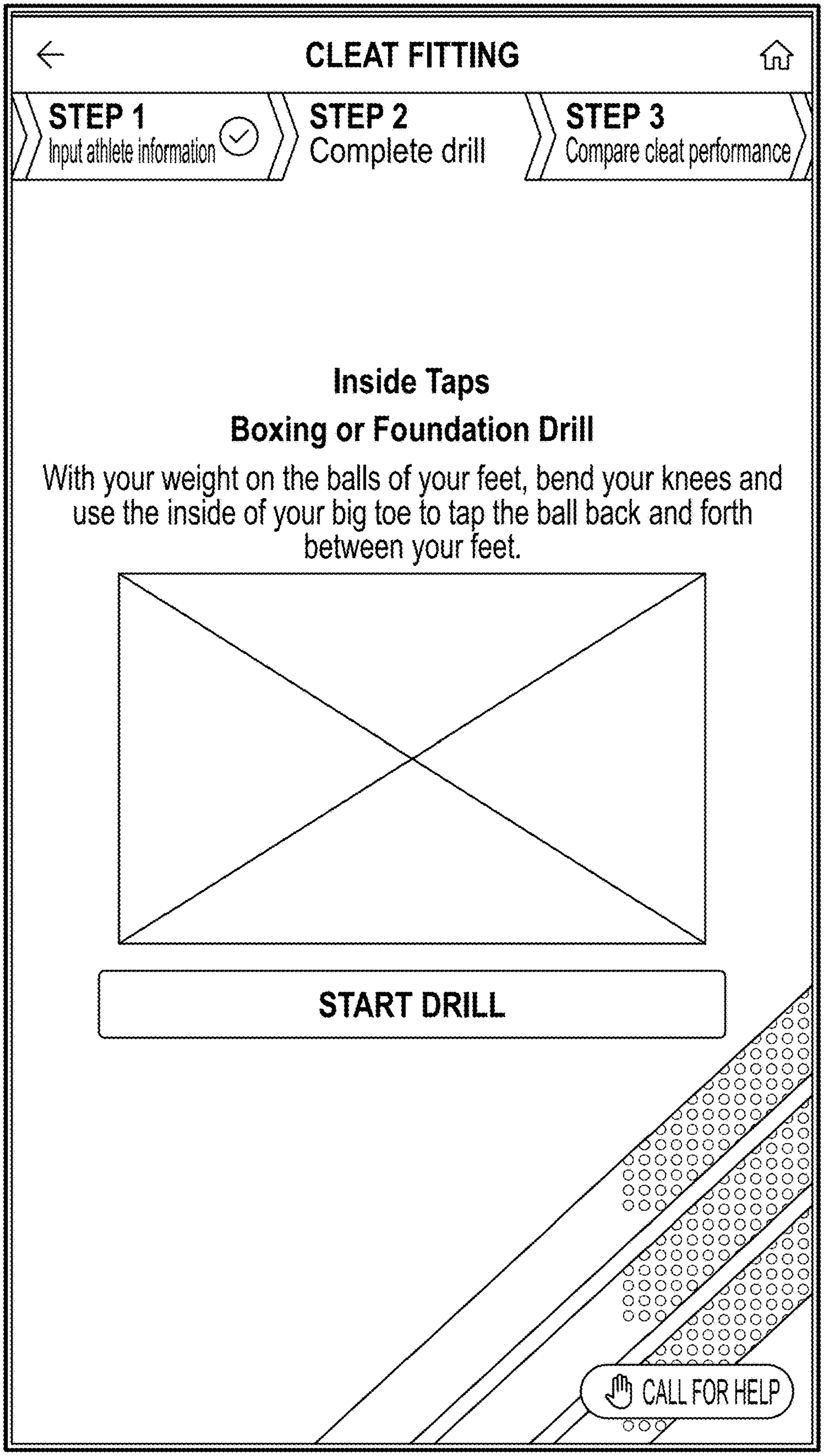
FIG. 16 is a user interface for use in illustrating user interactions pertaining to one or more modes of the flexible sports bay illustrated in FIG. 3, according to some embodiments.

FIG. 16 depicts an example user interface, according to some embodiments. The user interface can be generated responsive to the user selecting at least one of the icons described herein. For example, the user interface can be generated responsive to the user selecting at least icon shown in FIG. 15. The user interface can include at least one of a message, a visual cue, an instruction, and/or an indication pertaining to execution of at least one interaction. FIG. 16 depicts an example of the user interface including a message that describes how the user can execute the interactions pertaining to the inside taps drill. The user can select an icon, shown as start drill icon, to provide an indication to the terminal 205 that the user is ready to initiate execution of the interactions.

Figure 17:
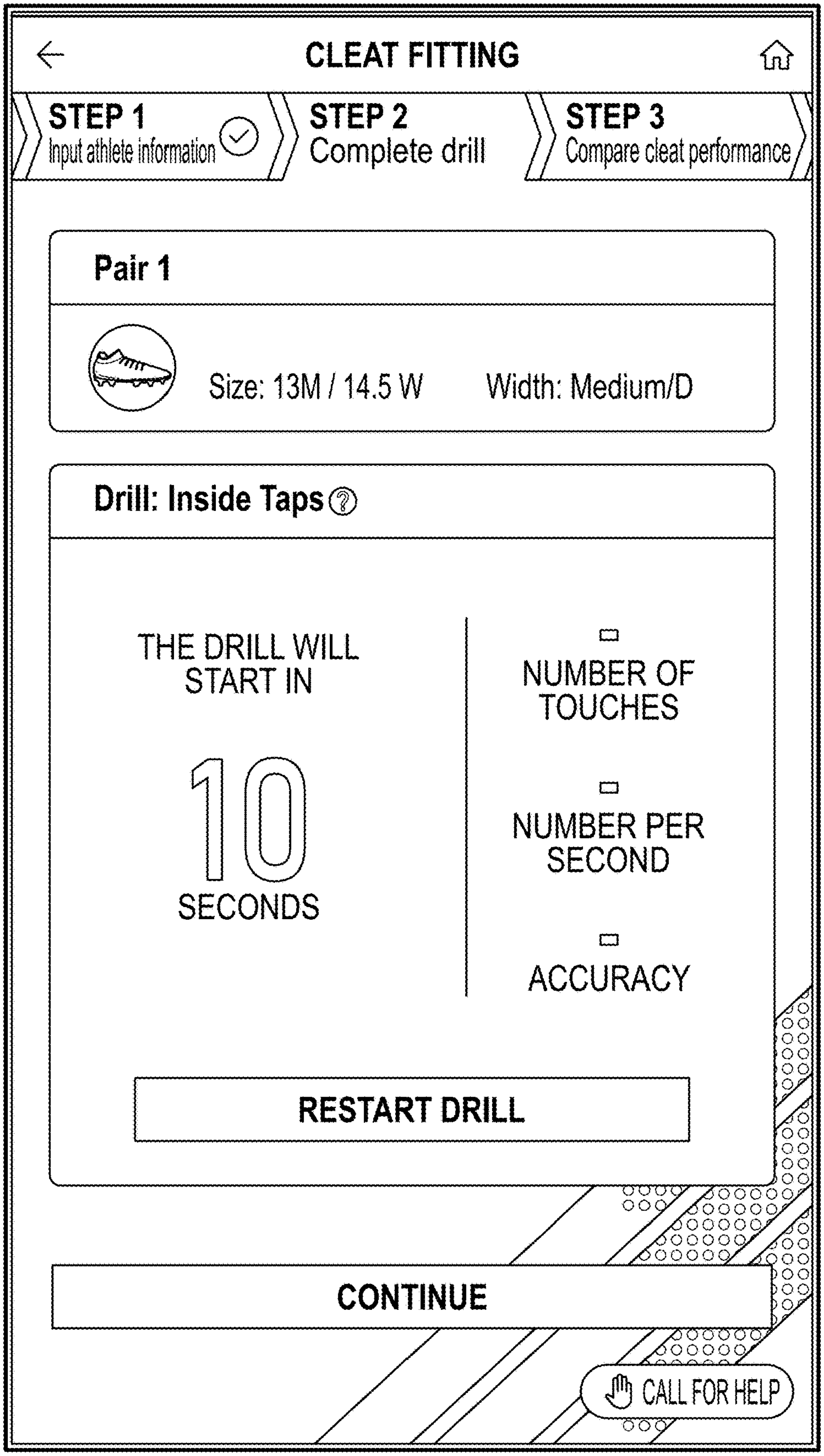
FIG. 17 is a user interface for use in tracking information obtained pertaining to user interactions with the flexible sports bay illustrated in FIG. 3, according to some embodiments.

FIG. 17 depicts an example user interface, according to some embodiments. The user interface can be generated responsive to the user selecting at least one of the icons described herein. For example, the user interface can be generated responsive to the user selecting at least one icon shown in FIG. 16. The user interface can include an indication of a given piece of sports equipment. FIG. 16 depicts an example of the user interface indicating a pair of soccer cleats. The user interface can also include a window and/or region pertaining to the selected drill. The window can include a countdown timer, a number of touches tracker, a touches per second tracker, and an accuracy tracker. The elements of the window can be updated, adjusted, modified, and/or change as the user performs and/or executes the interactions.

Figure 18:
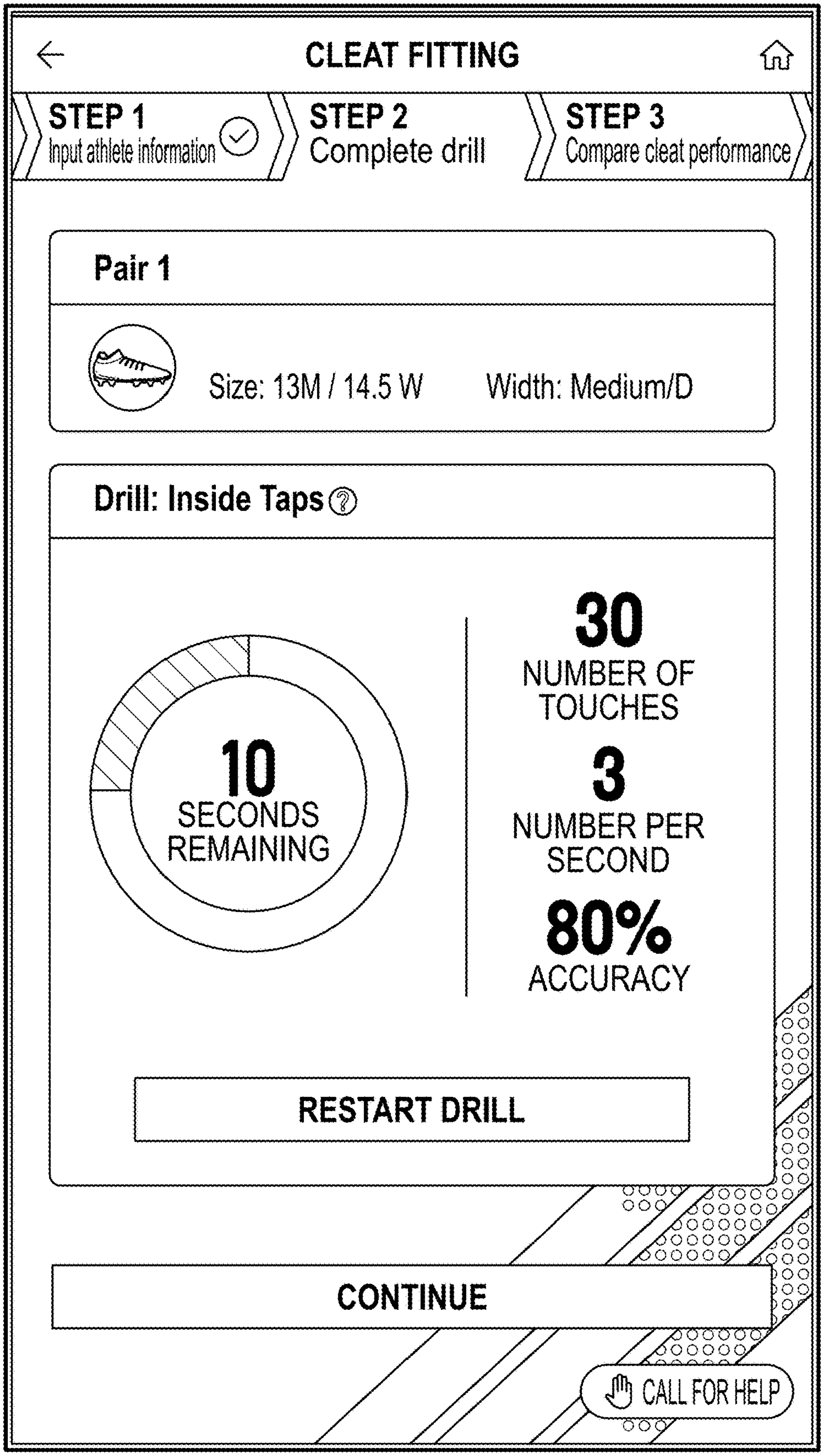
FIG. 18 is a user interface for use in tracking information obtained pertaining to user interactions with the flexible sports bay illustrated in FIG. 3, according to some embodiments.

FIG. 18 depicts an example user interface, according to some embodiments. The user interface can be generated responsive to initiating and/or responsive to completion of the user interactions. For example, the user interface may be generated responsive to the user completing a given number of soccer kicks. The user interface may also be generated responsive to the user selecting an icon display by the terminal 205. The user interface shown in FIG. 18 can include similar features and/or elements to that of the user interface shown in FIG. 17. For example, the user interface shown in FIG. 18 is shown to include the window having the countdown timer, the number of touches tracker, the touches per second tracker, and the accuracy tracker.

Figure 19:
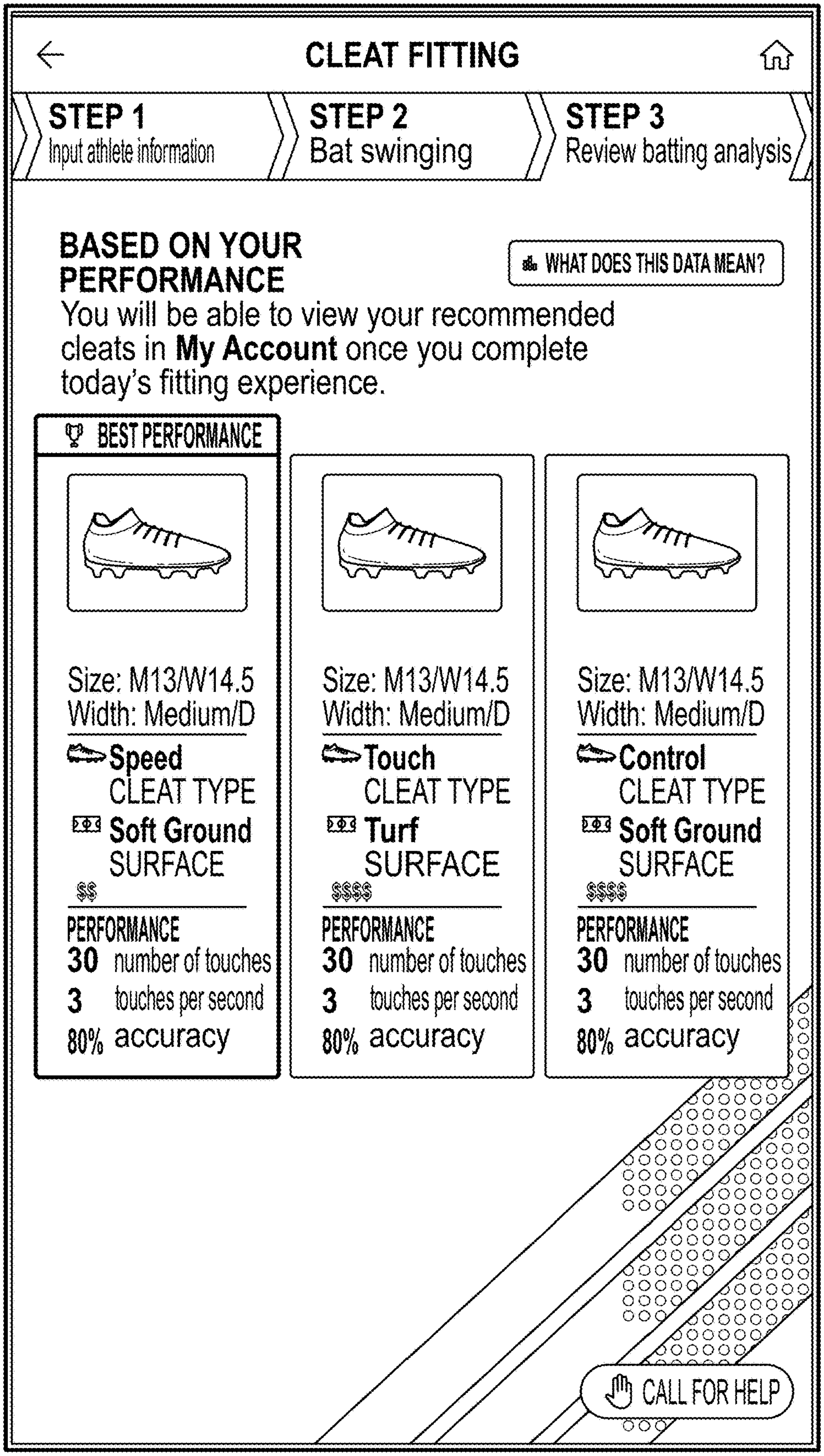
FIG. 19 is a user interface for use in providing information pertaining to one or more aspects of user interactions with the flexible sports bay illustrated in FIG. 3, according to some embodiments.

FIG. 19 depicts an example user interface, according to some embodiments. The user interface can be generated responsive to completion of the user interactions. For example, the user interface may be generated responsive to the user completing the selected drill. The user interface may also be generated responsive to the user selecting an icon display by the terminal 205. The user interface shown in FIG. 19 can be generated responsive to the terminal 205 and/or the interaction management system 105 completing an analysis of the user interactions. For example, the terminal 205 can analyze the performance metrics associated with each soccer ball kick and/or soccer ball touch pertaining to the user interactions. The terminal 205 can provide one or more recommendations based on the analysis. FIG. 19 depicts an example of the user interface including soccer cleat recommendations. The soccer cleat recommendations may include soccer cleats that the user excelled in using during the user interactions. The recommendation may also include soccer cleats that meet a predetermined threshold.

Figure 20:
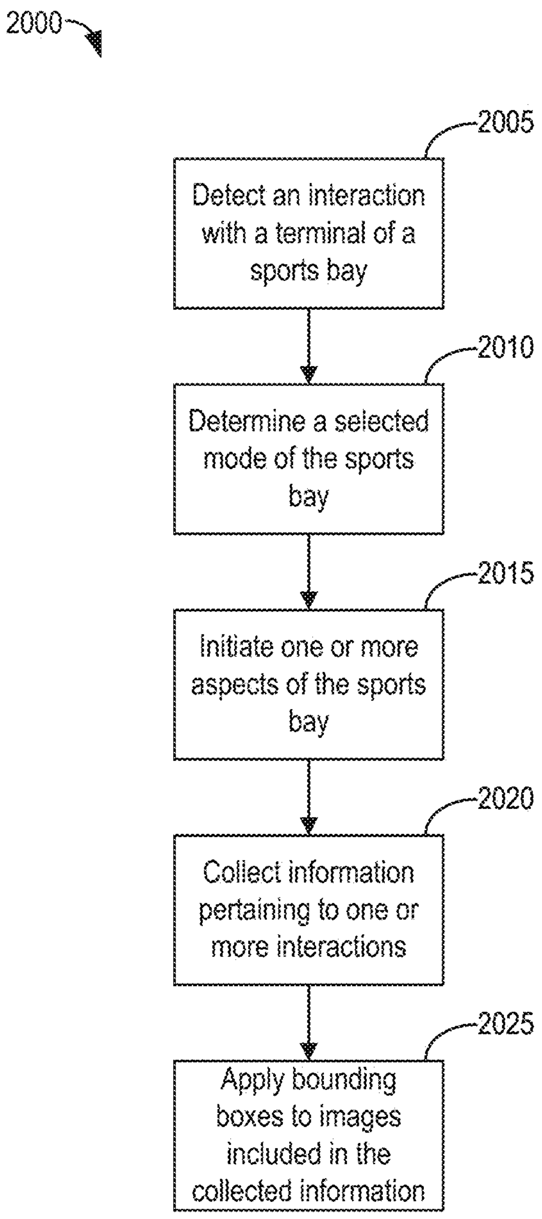
FIG. 20 is a flow diagram of a process of controlling a functionality of the flexible sports bay illustrated in FIG. 3, according to some embodiments.

FIG. 20 depicts a flow diagram of a process 2000 for performing at least one mode of the flexible sports bay, according to some embodiments. The flexible sports bay can be and/or include the flexible sports bay 302. The modes can be and/or include at least one of the modes and/or user interactions described herein. At least one step of the process 2000 can be performed by various systems, devices, and/or components described herein. For example, at least one step of the process 2000 can be performed by the terminal 205.

At step 2005, an interaction with a terminal of a sports bay can be detected. The terminal can be the terminal 205. The terminal 205 can detect the interaction responsive to an operator and/or a user of the terminal 205 selecting and/or otherwise interacting with a user interface. For example, the terminal 205 can detect when the user selects an icon include in the user interface. The interaction can be a user selecting a given mode of the flexible sports bay 302. For example, the selection can be the user selecting an icon associated with the soccer cleat fitting mode. The interaction can also be the user requesting a list of modes pertaining to the flexible sports bay 302.

At step 2010, a selected mode of the sports bay can be determined. For example, the interaction detected in step 2005 can be and/or include a selection of a mode of the flexible sports bay 302 and the selected mode can be determined. For example, the terminal 205 can determine that an icon pertaining to a given mode of the flexible sports bay 302 was selected. The terminal 205 can also determine the selected mode of the flexible sports bay 302 responsive to at least one detecting a piece of sports equipment, detecting a conversational input, detecting a scheduled appointment pertaining to the flexible sports bay 302, and/or among various possible combinations and/or alternatives.

At step 2015, one or more aspects of the sports bay can be initiated. For example, the terminal 205 can determine, based on the selected mode determined in step 2010, one or more operating parameters for the cameras 315. The operating parameters for the cameras 315 can pertain to and/or correspond to at least one of actions, steps, and processes that the cameras 315 perform to collect and/or capture information pertaining to interactions associated with the various modes of the flexible sports bay 302. The terminal 205 can also initiate the one or more aspects of the flexible sports bay 302 by at least one of configuring, updating, modifying, and/or altering the operating parameters of the cameras 315.

At step 2020, information pertaining to one or more interactions can be collected. For example, the cameras 315 can, based on the initiation performed in step 2015, collect at least one of images, photos, videos, performance information and/or among possible combinations and/or alternatives. For example, the cameras 315 can collect images of the user interacting with the soccer ball and the interactions can correspond to the selected mode of the flexible sports bay 302. For example, the selected mode can be the soccer cleat fitting mode and the interactions can pertain to drills associated with the soccer cleating fitting mode.

At step 2025, bounding boxes can be applied to images included in the collected information. For example, the interaction management system 105 can detect images, included in the information collected by the cameras 315 in step 2020, and the interaction management system 105 can apply bounding boxes to objects included in the images. The interaction management system 105 can apply the bounding boxes to at least one of the user performing the user interactions, the object that the user is interacting with, one or more regions of the flexible sports bay 302, and/or among various possible combinations and/or alternatives.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented and/or arranged in combination in a single implementation. Conversely, various features that are described in the context of a single implementation can also be implemented and arranged in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative implementations described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations, implementations, illustrative embodiments, and embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, arrangements, elements, or acts of the systems and methods herein referred to in the singular may also embrace implementations including a plurality of these elements, and any references in plural to any implementation, arrangement, element, or act herein may also embrace implementations including only a single element. References in the singular or plural form are not intended to limit the presently disclosed systems or methods, or their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components, including, but not limited to, processing circuitry, network interfaces, peripheral devices, input devices, output devices, and sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

What is claimed is:

1. A sports bay, comprising:

a terminal including one or more memory devices storing instructions thereon that, when executed by one or more processors, cause the one or more processors to:

receive, via one or more inputs provided to a display of the terminal, an indication of a selection of a plurality of pieces of sports equipment, the indication including information to identify the plurality of pieces of sports equipment, where the plurality of pieces of sports equipment are different from one another;

present, via the display of the terminal, responsive to receipt of the indication, a graphical representation of at least one first piece of sports equipment of the plurality of pieces of sports equipment;

provide, via the display of the terminal, responsive to receipt of a confirmation of the at least one first piece of sports equipment, a first prompt to initiate execution of at least one interaction of a plurality of interactions between an object and a user using the at least one first piece of sports equipment of the plurality of pieces of sports equipment to execute the plurality of interactions;

receive, from a camera responsive to execution of the plurality of interactions, a first set of data corresponding to the plurality of interactions;

identify, from the first set of data, one or more images associated with the plurality of interactions; and for the at least one interaction of the plurality of interactions:

execute a machine learning model to apply bounding boxes to one or more objects included in the one or more images;

determine, by the machine learning model responsive to application of the bounding boxes, one or more aspects of the plurality of interactions;

generate, using the one or more aspects, a performance metric corresponding to execution of the at least one interaction using the at least one first piece of sports equipment; and control the display to present a user interface that includes a selection of the at least one first piece of sports equipment, wherein the at least one first piece of sports equipment is selected based at least on a comparison of the performance metric with one or more performance metrics that correspond to execution of the at least one interaction with one or more second pieces of sports equipment of the plurality of pieces of sports equipment.

2. The sports bay of claim 1, wherein the instructions cause the one or more processors to:

provide, via the display of the terminal, a message including the performance metric for the plurality of interactions;

receive, from the display of the terminal, a second indication of a selection of a given piece of sports equipment of the plurality of pieces of sports equipment; and provide, via the display of the terminal responsive to receipt of the second indication, a graphical representation of one or more interactions of the plurality of interactions that pertain to the given piece of sports equipment of the plurality of pieces of sports equipment.

3. The sports bay of claim 1, wherein determine, by the machine learning model responsive to application of the bounding boxes, the one or more aspects of the plurality of interactions includes:

identifying, based on the one or more images, one or more positions of the user, wherein the one or more positions of the user pertain to the plurality of interactions;

comparing the one or more positions of the user with a plurality of predetermined positions;

detecting, responsive to comparing the one or more positions of the user with the plurality of predetermined positions, one or more given interactions of the plurality of interactions; and associating, based on the bounding boxes, the one or more given interactions of the plurality of interactions with one or more positions of the object.

4. The sports bay of claim 1, wherein generate, using the one or more aspects, the performance metric includes:

determining, based on the bounding boxes, points of contact between the user and the object pertaining to the at least one interaction of the plurality of interactions; and determining one or more scores for the at least one interaction of the plurality of interactions with one or more pieces of sports equipment of the plurality of pieces of sports equipment.

5. The sports bay of claim 1, wherein the instructions cause the one or more processors to:

receive, via the display of the terminal, a second indication of a selection of a given mode of a plurality of modes of the sports bay;

determine, responsive to receipt of the second indication, current operating parameters of the camera; and update the current operating parameters of the camera based on the selection of the given mode.

6. The sports bay of claim 1, wherein the instructions cause the one or more processors to:

determine, responsive to selection of a given mode of a plurality of modes of the sports bay, one or more changes to current operating parameters of the camera for use in capturing the plurality of interactions; and receive, responsive to the camera capturing the plurality of interactions, information pertaining to the plurality of interactions.

7. The sports bay of claim 1, wherein the instructions cause the one or more processors to:

evaluate, while the user performs the at least one interaction of the plurality of interactions based on information obtained by the camera, one or more characteristics of the user associated with the performance metric for the at least one interaction of the plurality of interactions; and generate, responsive to evaluation of the one or more characteristics, a recommendation for a second plurality of pieces of sports equipment, the second plurality of pieces of sports equipment including the at least one first piece of sports equipment used by the user and at least one second piece of sports equipment to adjust the one or more characteristics of the user.

8. The sports bay of claim 1, wherein the at least one first piece of sports equipment used by the user includes at least one of soccer cleats or a net, and wherein the object includes a soccer ball.

9. The sports bay of claim 1, wherein the camera is disposed proximate to the sports bay, and wherein the camera is adjustable between operating parameters based on signals provided by the one or more processors.

10. A system including one or more memory devices storing instructions thereon that, when executed by one or more processors, cause the one or more processors to:

receive, via one or more inputs provided to a display of a first device, an indication of a selection of a plurality of pieces of sports equipment, the indication including information to identify the plurality of pieces of sports equipment, wherein the plurality of pieces of sports equipment are different from one another;

present, via the display of the first device, responsive to receipt of the indication, a graphical representation of at least one first piece of sports equipment of the plurality of pieces of sports equipment;

provide, via the display of the first device, responsive to receipt of a confirmation of the at least one first piece of sports equipment, a first prompt to initiate execution of at least one interaction of a plurality of interactions between an object and a user using the at least one first piece of sports equipment of the plurality of pieces of sports equipment to execute the plurality of interactions;

receive, from a second device responsive to execution of the plurality of interactions, a first set of data corresponding to the plurality of interactions;

identify, from the first set of data, one or more images associated with the plurality of interactions; and for the at least one interaction:

execute a machine learning model to apply bounding boxes to one or more objects included in the one or more images;

determine, by the machine learning model responsive to application of the bounding boxes, one or more aspects of the at least one interaction of the plurality of interactions;

generate, using the one or more aspects, a performance metric corresponding to execution of the at least one interaction using the at least one first piece of sports equipment; and control the display to present a user interface that includes a selection of the at least one first piece of sports equipment, wherein the at least one first piece of sports equipment is selected based at least on a comparison of the performance metric with one or more performance metrics that correspond to execution of the at least one interaction with one or more second pieces of sports equipment of the plurality of pieces of sports equipment.

11. The system of claim 10, wherein the instructions cause the one or more processors to:

provide, via the display of the first device, a message including the performance metric for the plurality of interactions;

receive, from the display of the first device, a second indication of a selection of a given piece of sports equipment of the plurality of pieces of sports equipment; and provide, via the display of the first device responsive to receipt of the second indication, a graphical representation of one or more interactions of the plurality of interactions that pertain to the given piece of sports equipment of the plurality of pieces of sports equipment.

12. The system of claim 10, wherein determine, by the machine learning model responsive to application of the bounding boxes, the one or more aspects of the plurality of interactions includes:

identifying, based on the one or more images, one or more positions of the user, wherein the one or more positions of the user pertain to the plurality of interactions;

comparing the one or more positions of the user with a plurality of predetermined positions;

detecting, responsive to comparing the one or more positions of the user with the plurality of predetermined positions, one or more given interactions of the plurality of interactions; and associating, based on the bounding boxes, the one or more given interactions of the plurality of interactions with one or more positions of the object.

13. The system of claim 10, wherein generate, using the one or more aspects, the performance metric includes:

determining, based on the bounding boxes, points of contact between the user and the object pertaining to the at least one interaction of the plurality of interactions; and determining one or more scores for the at least one interaction of the plurality of interactions with one or more pieces of sports equipment of the plurality of pieces of sports equipment.

14. The system of claim 10, wherein the instructions cause the one or more processors to:

receive, via the display of the first device, a second indication of a selection of a given mode of a plurality of modes of a sports bay;

determine, responsive to receipt of the second indication, current operating parameters of the second device; and update the current operating parameters of the second device based on the selection of the given mode.

15. The system of claim 10, wherein the instructions cause the one or more processors to:

determine, responsive to selection of a given mode of a plurality of modes of a sports bay, one or more changes to current operating parameters of the second device for use in capturing the plurality of interactions; and receive, responsive to the second device capturing the plurality of interactions, information pertaining to the plurality of interactions.

16. The system of claim 10, wherein the instructions cause the one or more processors to:

evaluate, while the user performs the at least one interaction of the plurality of interactions based on information obtained by the second device, one or more characteristics of the user associated with the performance metric for the at least one interaction of the plurality of interactions; and generate, responsive to evaluation of the one or more characteristics, a recommendation for a second plurality of pieces of sports equipment, the second plurality of pieces of sports equipment including the at least one first piece of sports equipment used by the user and at least one second piece of sports equipment to adjust the one or more characteristics of the user.

17. A terminal for a sports bay, the terminal including one or more memory devices storing instructions thereon that, when executed by one or more processors, cause the one or more processors to:

receive, via one or more inputs provided to a display of the terminal, an indication of a selection of a plurality of pieces of soccer equipment, the indication including information to identify the plurality of pieces of soccer equipment, the plurality of pieces of soccer equipment including at least one of soccer cleats, a soccer ball, or a net, wherein the plurality of pieces of soccer equipment are different;

present, via the display of the terminal, responsive to receipt of the indication, a graphical representation of at least one first piece of soccer equipment of the plurality of pieces of soccer equipment;

provide, via the display of the terminal, responsive to receipt of a confirmation of the at least one first piece of soccer equipment, a first prompt to initiate execution of at least one interaction of a plurality of interactions between an object and a user using the at least one first piece of soccer equipment of the plurality of pieces of soccer equipment to execute the plurality of interactions;

receive, from a camera responsive to execution of the plurality of interactions, a first set of data corresponding to the plurality of interactions; and for the at least one interaction:

determine, by a machine learning model responsive to application of bounding, one or more aspects of the plurality of interactions;

generate, using the one or more aspects, a performance metric corresponding to execution of the at least one interaction using the at least one first piece of soccer equipment; and control the display to present a user interface that includes a selection of the at least one first piece of sports equipment, wherein the at least one first piece of sports equipment is selected based at least on a comparison of the performance metric with one or more performance metrics that correspond to execution of the at least one interaction with one or more second pieces of sports equipment of the plurality of pieces of sports equipment.

18. The terminal of claim 17, wherein the instructions cause the one or more processors to:

provide, via the display of the terminal, a message including the performance metric for the plurality of interactions;

receive, from the display of the terminal, a second indication of a selection of a given piece of soccer equipment of the plurality of pieces of soccer equipment; and provide, via the display of the terminal responsive to receipt of the second indication, a graphical representation of one or more interactions of the plurality of interactions that pertain to the given piece of soccer equipment of the plurality of pieces of soccer equipment.

19. The terminal of claim 17, wherein determine, by the machine learning model responsive to application of the bounding boxes, the one or more aspects of the plurality of interactions includes:

identifying, based on one or more images captured by the camera, one or more positions of the user, wherein the one or more positions of the user pertain to the plurality of interactions;

comparing the one or more positions of the user with a plurality of predetermined positions;

detecting, responsive to comparing the one or more positions of the user with the plurality of predetermined positions, one or more given interactions of the plurality of interactions; and associating, based on the bounding boxes, the one or more given interactions of the plurality of interactions with one or more positions of the object.

20. The terminal of claim 17, wherein the instructions cause the one or more processors to:

receive, via the display of the terminal, a second indication of a selection of a given mode of a plurality of modes of the sports bay;

determine, responsive to receipt of the second indication, current operating parameters of the camera; and update the current operating parameters of the camera based on the selection of the given mode.

* * * * *